United States Patent
Hieda et al.

(10) Patent No.: US 11,319,990 B2
(45) Date of Patent: May 3, 2022

(54) ROLLING BEARING DEVICE

(71) Applicant: JTEKT CORPORATION, Osaka (JP)

(72) Inventors: Takahito Hieda, Kashihara (JP); Naoki Tani, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/188,407

(22) Filed: Mar. 1, 2021

(65) Prior Publication Data
US 2021/0277939 A1     Sep. 9, 2021

(30) Foreign Application Priority Data

Mar. 6, 2020   (JP) ............................ JP2020-038492
May 22, 2020   (JP) ............................ JP2020-089471
Sep. 10, 2020  (JP) ............................ JP2020-151992

(51) Int. Cl.
*F16C 19/52*     (2006.01)
*F16C 19/06*     (2006.01)

(52) U.S. Cl.
CPC ............ *F16C 19/522* (2013.01); *F16C 19/06* (2013.01); *F16C 2233/00* (2013.01)

(58) Field of Classification Search
CPC .... F16C 19/06; F16C 19/522; F16C 2233/00; G01L 5/0019
See application file for complete search history.

(56) References Cited

U.S. PATENT DOCUMENTS

| | | | |
|---|---|---|---|
| 8,540,431 B2* | 9/2013 | Nishikawa | G01L 5/0019 384/448 |
| 8,567,260 B2* | 10/2013 | Nishikawa | F16C 19/186 73/862.041 |
| 8,596,146 B2* | 12/2013 | Ono | B60B 27/0005 73/862.045 |
| 2006/0243068 A1 | 11/2006 | Ueno et al. | |
| 2009/0097791 A1* | 4/2009 | Ozaki | F16C 19/522 384/448 |
| 2009/0114004 A1* | 5/2009 | Ozaki | B60B 27/0068 73/117.01 |

(Continued)

FOREIGN PATENT DOCUMENTS

JP     2007-032705 A     2/2007
JP     2007-239848 A     9/2007

(Continued)

*Primary Examiner* — Phillip A Johnson
(74) *Attorney, Agent, or Firm* — Oliff PLC

(57) ABSTRACT

A rolling bearing device includes a rolling bearing that includes an outer ring having an inner peripheral surface on which a first raceway surface is provided, an inner ring having an outer peripheral surface on which a second raceway surface is provided, and rolling elements interposed between the first and the second raceway surfaces; a strain sensor configured to detect a strain of the rolling bearing; and a fixation portion configured to fix the strain sensor to a peripheral surface that includes at least one of an outer peripheral surface of the outer ring and an inner peripheral surface of the inner ring. The fixation portion fixes at least two locations in the strain sensor to the peripheral surface such that a detection region of the strain sensor and the peripheral surface are not fixed to each other, the at least two locations facing each other across the detection region.

7 Claims, 22 Drawing Sheets

(56) References Cited

U.S. PATENT DOCUMENTS

| | | | | |
|---|---|---|---|---|
| 2009/0301222 A1* | 12/2009 | Takahashi | ............ | F16C 19/186 |
| | | | | 73/862.044 |
| 2010/0129016 A1* | 5/2010 | Isobe | .................... | F16C 33/586 |
| | | | | 384/448 |
| 2010/0129017 A1* | 5/2010 | Isobe | .................. | B60B 27/0094 |
| | | | | 384/448 |
| 2010/0262383 A1* | 10/2010 | Isobe | .................... | F16C 19/186 |
| | | | | 702/42 |

FOREIGN PATENT DOCUMENTS

| | | | | | |
|---|---|---|---|---|---|
| JP | 2010139303 A | * | 6/2010 | ........... | G01L 5/0019 |
| JP | 2017-044312 A | | 3/2017 | | |

* cited by examiner

FIG. 2
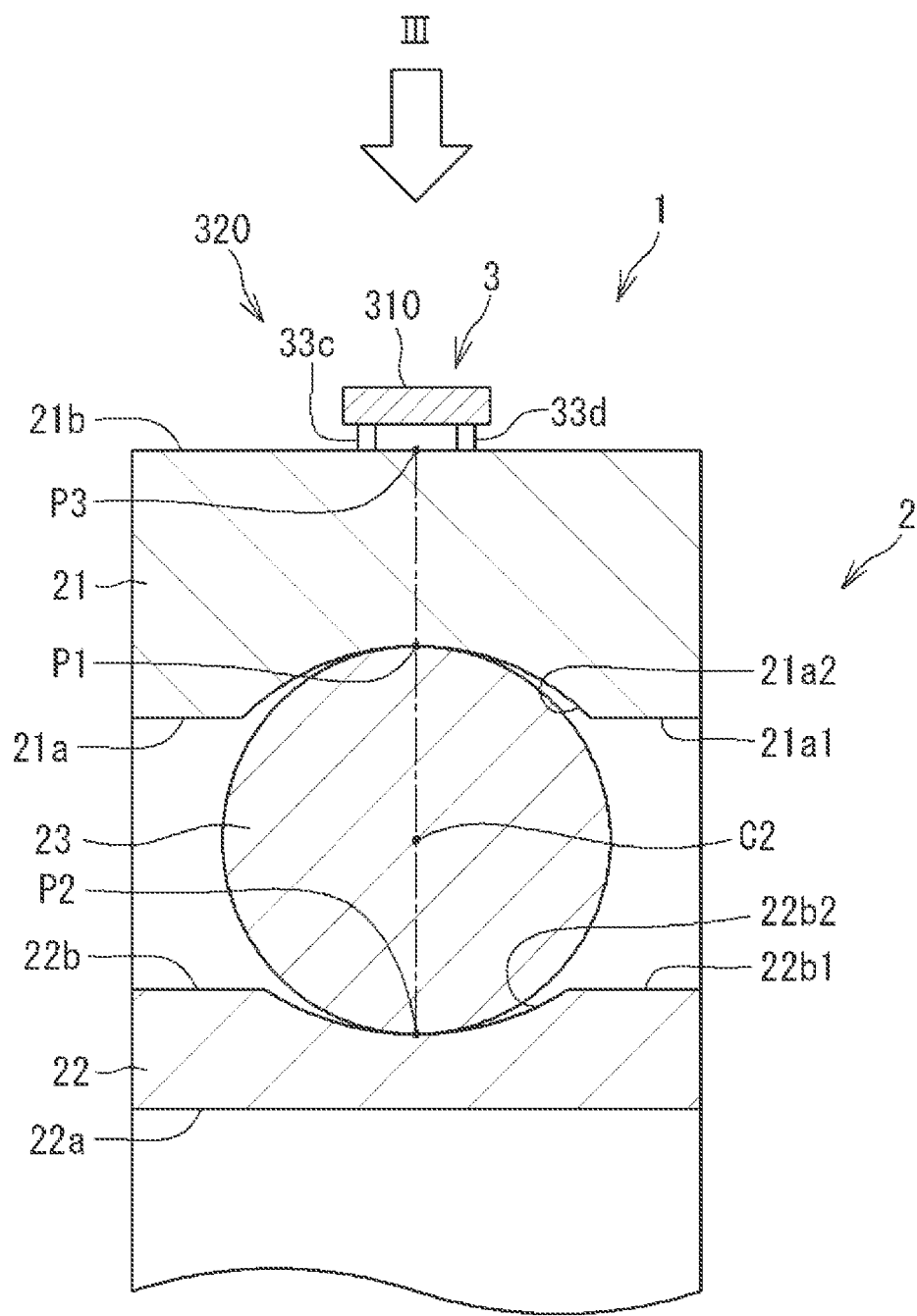
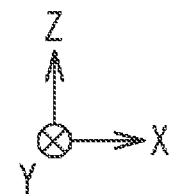

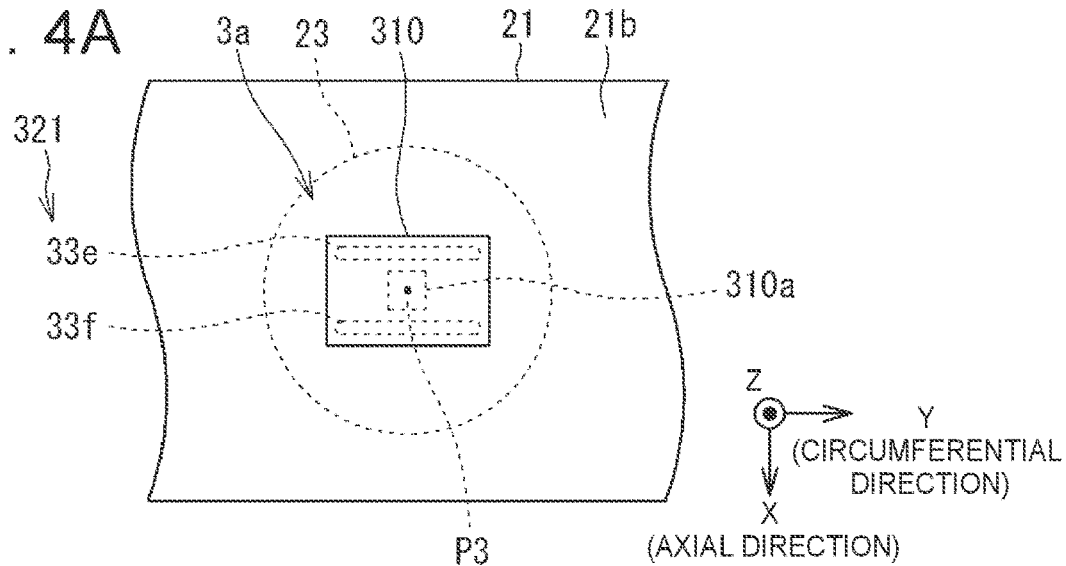
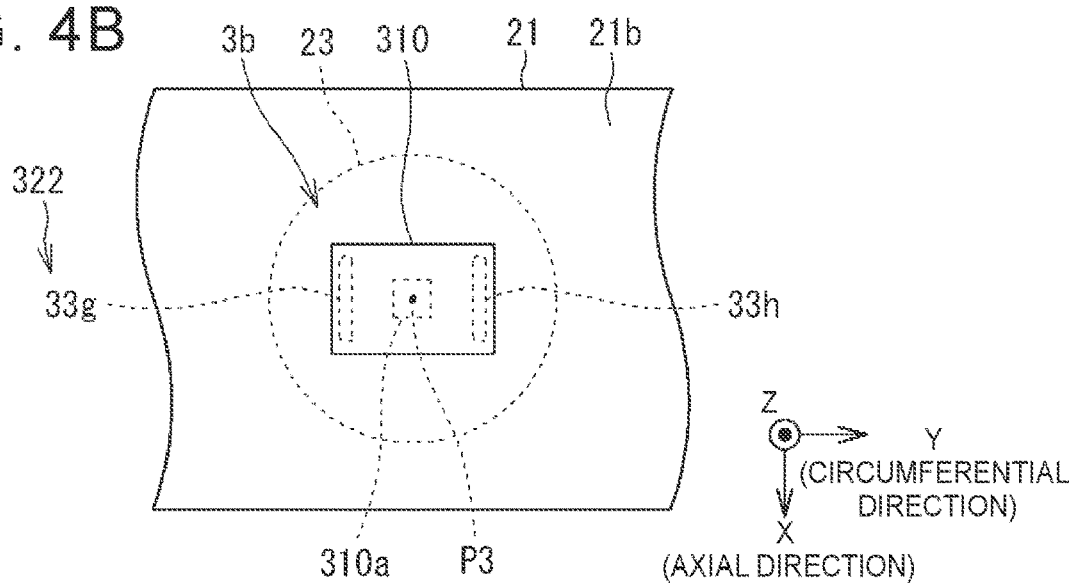
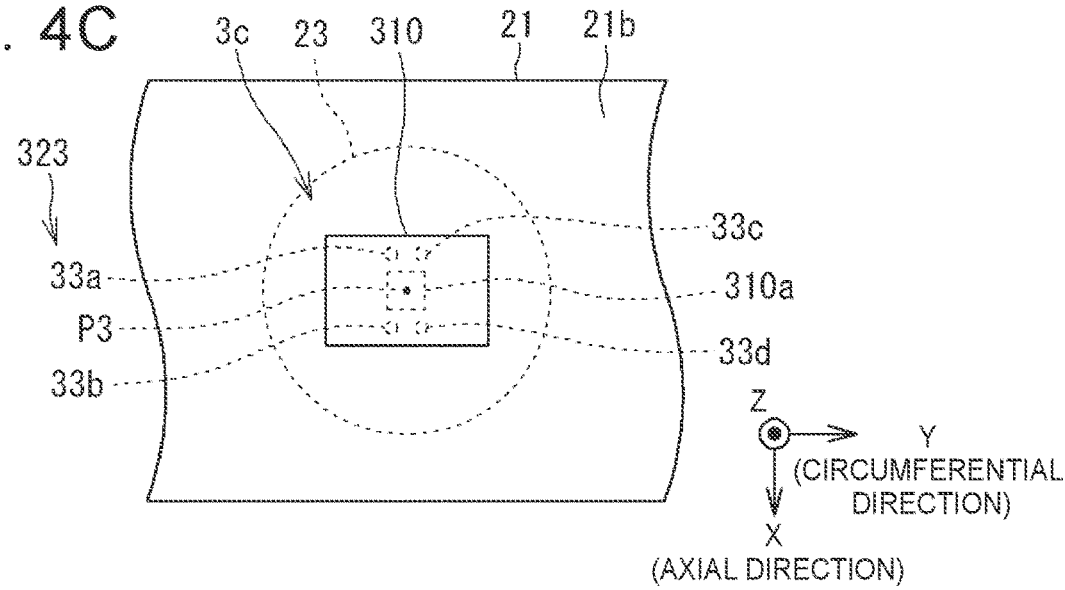

FIG. 9
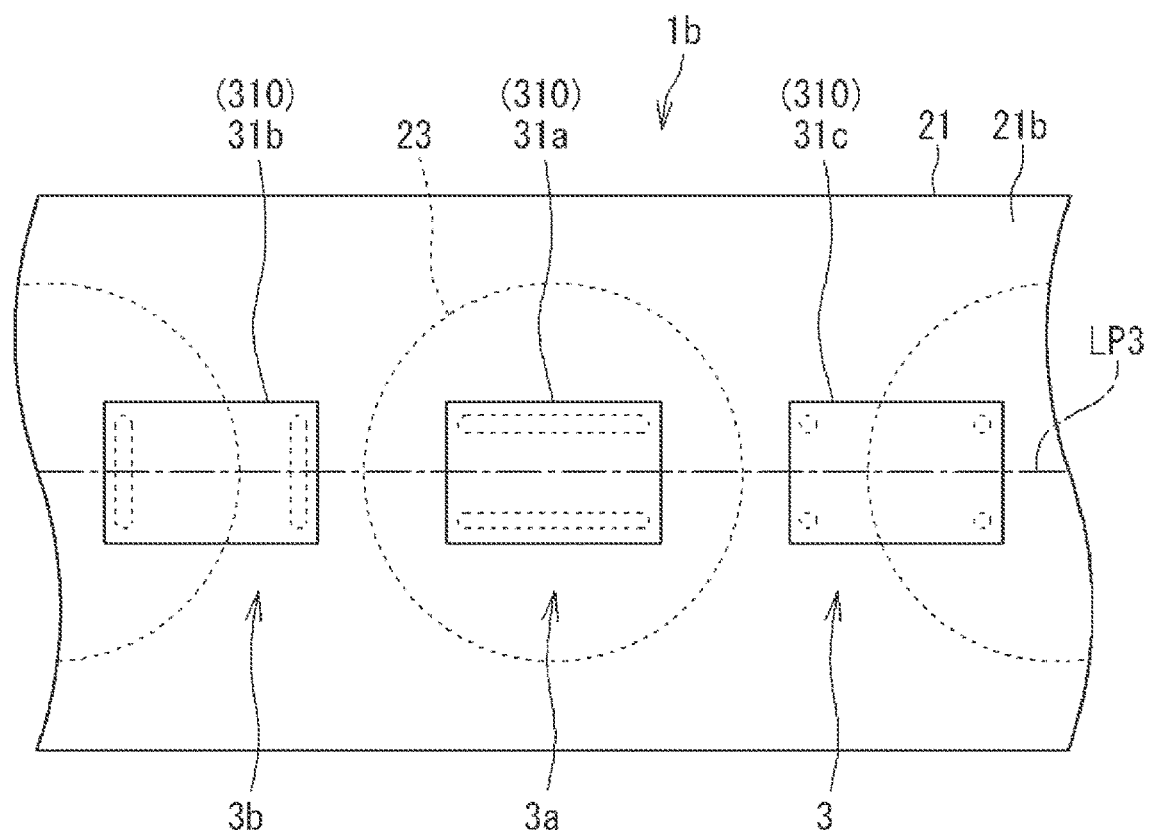
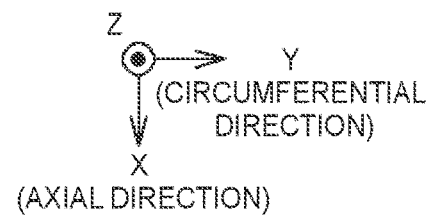

FIG. 16A
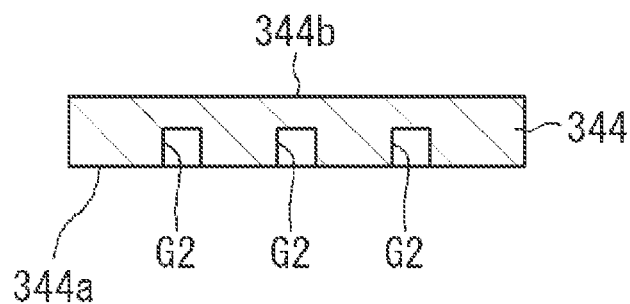
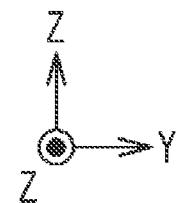
FIG. 16B
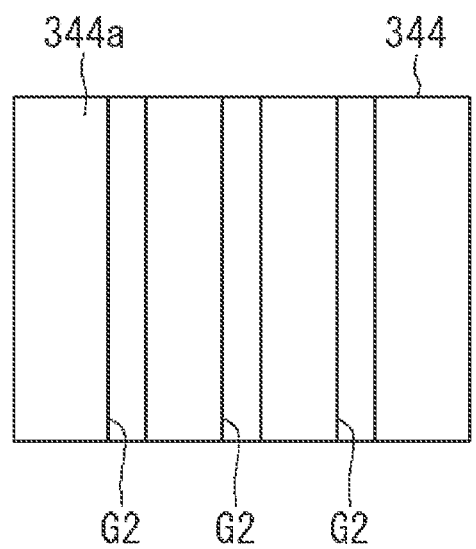
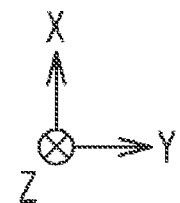

FIG. 17A
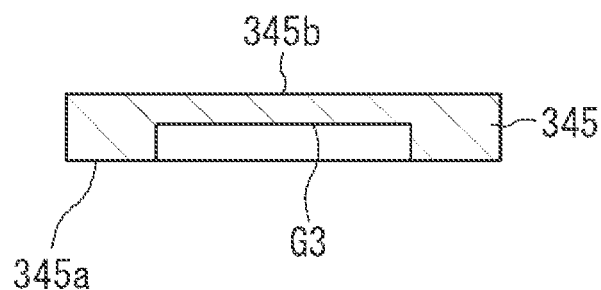
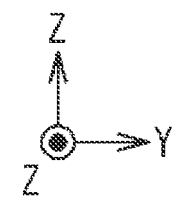
FIG. 17B
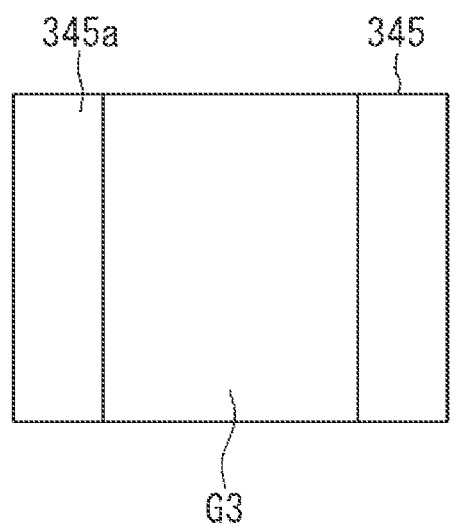
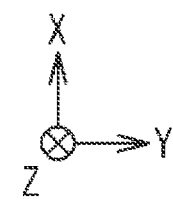

FIG. 18A
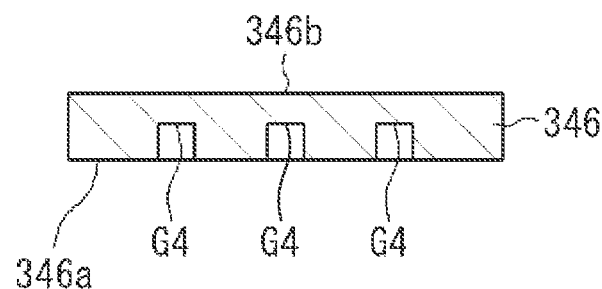
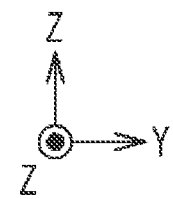
FIG. 18B
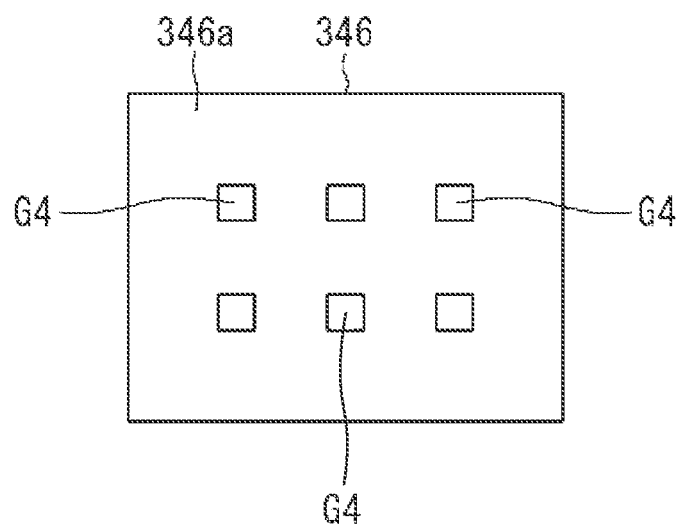
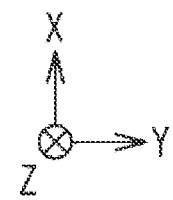

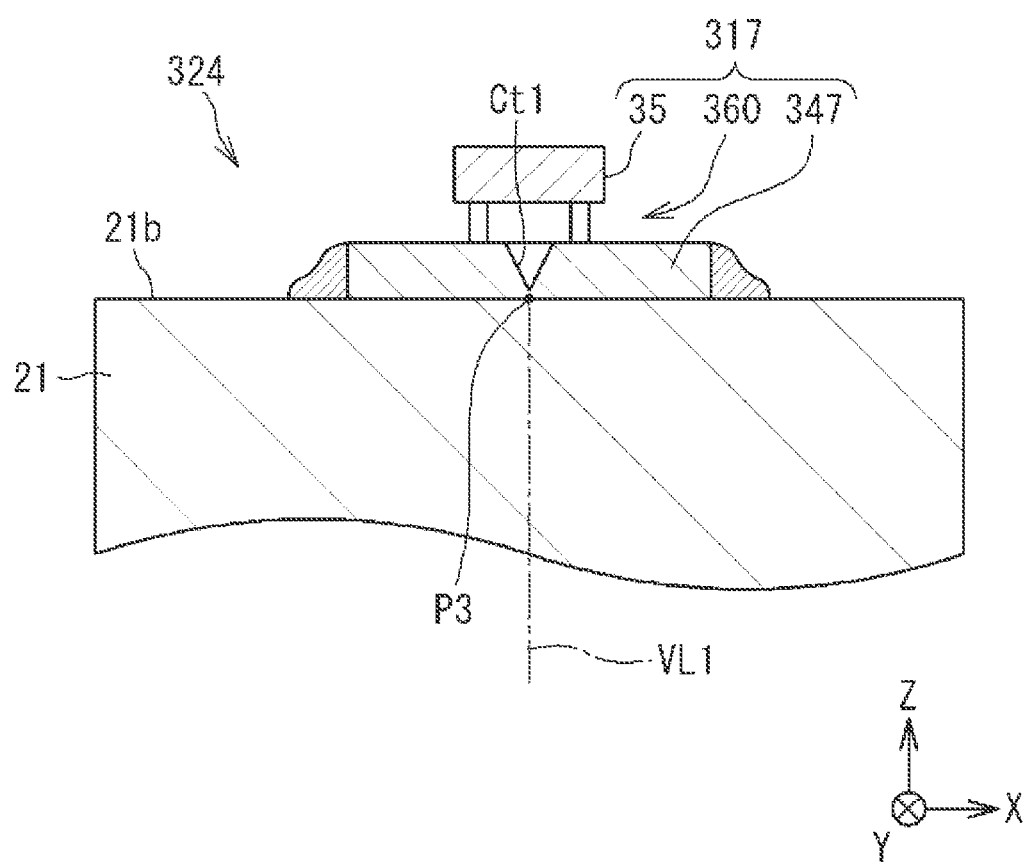

ROLLING BEARING DEVICE

CROSS-REFERENCE TO RELATED APPLICATIONS

This application claims priority to Japanese Patent Application No. 2020-038492 filed on Mar. 6, 2020, Japanese Patent Application No. 2020-089471 filed on May 22, 2020, and Japanese Patent Application No. 2020-151992 filed on Sep. 10, 2020, each incorporated herein by reference in its entirety.

BACKGROUND

1. Technical Field

The disclosure relates to a rolling bearing device.

2. Description of Related Art

There is known an art of detecting a state of a rolling bearing through the use of a strain sensor attached to the rolling bearing. For example, in each of Japanese Unexamined Patent Application Publication No. 2017-44312 (JP 2017-44312 A) and Japanese Unexamined Patent Application Publication No. 2007-32705 (JP 2007-32705 A), there is disclosed a sensor-equipped bearing having a strain sensor arranged in a groove portion provided in an outer peripheral surface of an outer ring. Besides, in Japanese Unexamined Patent Application Publication No. 2007-239848 (JP 2007-239848 A), there is disclosed a sensor-equipped wheel bearing that includes a sensor unit including a sensor attachment member attached to an external member, and a strain sensor attached to the sensor attachment member. JP 2007-239848 A discloses an example in which the strain sensor is fixed to the sensor attachment member through adhesion, and an example in which the strain sensor is formed on a surface of the sensor attachment member through printing and calcination (paragraph 0050, FIG. 10, and the like).

SUMMARY

There have been demands for a rolling bearing including a contact-type sensor having higher durability. However, in the case where a contact-type strain sensor, a contact-type temperature sensor, or the like is attached to the rolling bearing, the durability of a joint region of the rolling bearing and the sensor (i.e., a joint region where the rolling bearing and sensor are joined to each other) tends to be lower than the durability of the other regions of the rolling bearing when a certain method of attachment (e.g., joining by adhesion or welding) is adopted. Therefore, in the case of the rolling bearing including the contact-type sensor, it is important to enhance the durability of the joint region of the sensor and the rolling bearing.

In particular, in the case where a strain sensor is used as the above-mentioned contact-type sensor, it is conceivable to join the strain sensor to a part of the rolling bearing to which a large load is applied, as a method of detecting the strain of the rolling bearing with high sensitivity. However, this configuration also leads to an increased stress produced in the joint region of the rolling bearing and the strain sensor. Therefore, the durability of the joint region may decrease, a joint portion for joining the strain sensor and the rolling bearing, and the like may be damaged, and the strain sensor is likely to separate from the rolling bearing. It is therefore difficult to fulfill both requirements, namely, detection of the strain with high sensitivity and enhancement of the durability of the joint region.

The disclosure retrains the durability of a joint part of a rolling bearing and a strain sensor from decreasing, while maintaining the sensitivity of the strain sensor at high level.

(1) A rolling bearing device according to an aspect of the disclosure includes a rolling bearing that includes an outer ring having an inner peripheral surface on which a first raceway surface is provided, an inner ring having an outer peripheral surface on which a second raceway surface is provided, and a plurality of rolling elements interposed between the first raceway surface and the second raceway surface; a strain sensor configured to detect a strain of the rolling bearing; and a fixation portion configured to fix the strain sensor to a peripheral surface that includes at least one of an outer peripheral surface of the outer ring and an inner peripheral surface of the inner ring. The fixation portion fixes at least two locations in the strain sensor to the peripheral surface such that a detection region of the strain sensor and the peripheral surface are not fixed to each other, the at least two locations facing each other across the detection region.

When the detection region of the strain sensor faces a part of the peripheral surface where a larger strain is produced, the strain sensor can detect the strain with higher sensitivity. The fixation portion fixes the strain sensor and the peripheral surface to each other such that the detection region of the strain sensor faces the peripheral surface, at a position avoiding that part. Therefore, the stress produced at the fixation portion can be made smaller than in the case where the strain sensor and the peripheral surface are entirely fixed to each other. Thus, the durability of the fixation portion can be further enhanced. Besides, when the peripheral surface is strained in a direction in which the peripheral surface is elongated, the strain sensor is pulled by the at least two locations in the fixation portion, the at least two locations facing other across the detection region. Thus, the strain produced in the detection region of the strain sensor can be further increased. Therefore, the rolling bearing device according to the disclosure makes it possible to restrain the durability of the joint part of the rolling bearing and the strain sensor (i.e., the joint part where the rolling bearing and the strain sensor are joined to each other) from decreasing, while maintaining the sensitivity of the strain sensor at high level.

(2) The strain sensor may include an intermediate member and a strain gauge; a first surface or a lateral surface of the intermediate member may be in contact with the fixation portion, the first surface being located on a side of the peripheral surface; and the strain gauge may be fixed to a second surface of the intermediate member, the second surface being located on a side opposite to the peripheral surface.

Even in the case where it is difficult to directly join the strain gauge to the peripheral surface of the rolling bearing, the strain gauge can be indirectly joined to the peripheral surface of the rolling bearing, through the use of the intermediate member (a buffer member) that can be easily joined to both the strain gauge and the peripheral surface.

(3) The strain sensor may further include a second fixation portion configured to fix at least two locations in the strain gauge to the second surface such that a second detection region of the strain gauge and the second surface are not fixed to each other, the at least two locations in the strain gauge facing each other across the second detection region.

With this configuration, the second fixation portion can release the stress transmitted from the intermediate member to the strain gauge. Therefore, the stress produced at the second fixation portion can be further reduced, and the durability of the second fixation portion can be further enhanced. Besides, when the intermediate member is strained in a direction in which the intermediate member is elongated, the strain gauge is pulled by the at least two locations in the second fixation portion, the at least two locations facing each other across the second detection region. Therefore, the strain produced in the second detection region can be further increased. Therefore, the strain gauge can detect the strain with higher sensitivity.

(4) The fixation portion may fix the strain sensor to at least two locations in the peripheral surface that face each other across a virtual intersection point where the peripheral surface and a virtual line intersect each other, the virtual line passing through a first point where one of the rolling elements contacts the first raceway surface and a second point where the one of the rolling elements contacts the second raceway surface; and the strain sensor may not be fixed to the virtual intersection point.

The strain in the part of the peripheral surface including the virtual intersection point tends to be larger than the strain in the other parts of the peripheral surface. Therefore, the strain sensor is further elongated, and the strain produced in the strain sensor can be further increased. Thus, the strain sensor can detect the strain with higher sensitivity.

(5) The fixation portion may include a plurality of joint portions configured to join the strain sensor and the peripheral surface to each other; each of the joint portions may have a shape that is long in one direction of a circumferential direction and an axial direction of the rolling bearing and that is short in another direction of the circumferential direction and the axial direction of the rolling bearing; at least two of the joint portions may be positioned apart from each other in the other direction and parallel to each other; and the strain sensor may not be fixed to the peripheral surface at a position between the joint portions positioned parallel to each other. With this configuration, the strain sensor can preferentially detect the strain produced in the other direction of the circumferential direction and the axial direction on the peripheral surface.

(6) The strain sensor may include a plurality of strain sensors; the fixation portion may include a plurality of fixation portions that respectively fix the strain sensors to the peripheral surface; and the strain sensors may include a first strain sensor joined to the peripheral surface by the joint portions each having a shape that is long in the circumferential direction and that is short in the axial direction, and a second strain sensor joined to the peripheral surface by the joint portions each having a shape that is long in the axial direction and that is short in the circumferential direction.

With this configuration, the strain of the rolling bearing can be detected as separate components, namely, a component in the axial direction and a component in the circumferential direction, through the use of the first strain sensor and the second strain sensor. Thus, the state of the rolling bearing can be detected in more detail.

(7) The intermediate member may include two split members that are positioned apart from each other in a direction including at least one of an axial direction and a circumferential direction of the rolling bearing; and the second fixation portion may fix the strain gauge to each of the two split members.

With this configuration, the strain gauge preferentially detects the strain in the direction in which the intermediate member is split. Moreover, the direction in which the amount of elongation and contraction of the intermediate member is large due to thermal expansion may be different from the direction in which the intermediate member is split. Thus, even in the case where there is a difference in thermal expansion coefficient between the intermediate member and the strain gauge, the strain gauge is unlikely to detect deformation of the intermediate member resulting from thermal expansion thereof, as a strain. Therefore, the strain of the rolling bearing can be more accurately detected.

(8) The intermediate member may include an absorption region configured to absorb deformation of the intermediate member due to a difference in thermal expansion between the strain gauge or the peripheral surface and the intermediate member. Even in the case where the intermediate member thermally expands, the absorption region absorbs deformation of the intermediate member. As a result, the strain gauge is unlikely to detect deformation of the intermediate member as a strain. Therefore, the strain gauge can more accurately detect the strain of the rolling bearing.

(9) The absorption region may be a hole extending from the first surface to the second surface, or a notch provided in the first surface or the second surface. With this configuration, the intermediate member deforms such that the hole or the notch narrows, and hence the intermediate member can be prevented from deforming in the radial direction, even in the case where the intermediate member thermally expands.

(10) At least part of the absorption region may be provided at a position that overlaps with the second detection region in a plan view obtained when the strain sensor is viewed in a radial direction of the rolling bearing. With this configuration, the deformed intermediate member can be more reliably prevented from coming into contact with the second detection region, even in the case where a strain is produced in the intermediate member due to a difference in thermal expansion. As a result, the strain gauge can more accurately detect the strain of the rolling bearing.

The foregoing aspect of the disclosure can restrain the durability of the joint part of the rolling bearing and the strain sensor from decreasing, while maintaining the sensitivity of the strain sensor at high level.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a cross-sectional view partially showing a cross-section of the rolling bearing device along a ZX-plane on which a virtual line passes;

FIG. 4A is a plan view showing a strain detection unit according to a first modification example;

FIG. 4B is another plan view showing the strain detection unit according to the first modification example;

FIG. 4C is another plan view showing the strain detection unit according to the first modification example;

FIG. 9 is a plan view partially showing a rolling bearing device according to a fourth modification example;

FIG. 16A is an illustrative view illustrating an intermediate member according to a tenth modification example;

FIG. 16B is another illustrative view illustrating the intermediate member according to the tenth modification example;

FIG. 17A is still another illustrative view illustrating the intermediate member according to the tenth modification example;

FIG. 17B is still another illustrative view illustrating the intermediate member according to the tenth modification example;

FIG. 18A is still another illustrative view illustrating the intermediate member according to the tenth modification example;

FIG. 18B is still another illustrative view illustrating the intermediate member according to the tenth modification example;

FIG. 22 is a cross-sectional view illustrating a variation of the eleventh modification example.

DETAILED DESCRIPTION OF EMBODIMENTS

Embodiments

A rolling bearing device according to an embodiment of the disclosure will be described hereinafter with reference to the drawings. In each of the drawings, an XYZ orthogonal coordinate system is appropriately depicted to clarify a positional relationship in the rolling bearing device.

Configuration of Rolling Bearing Device

Figure 1:
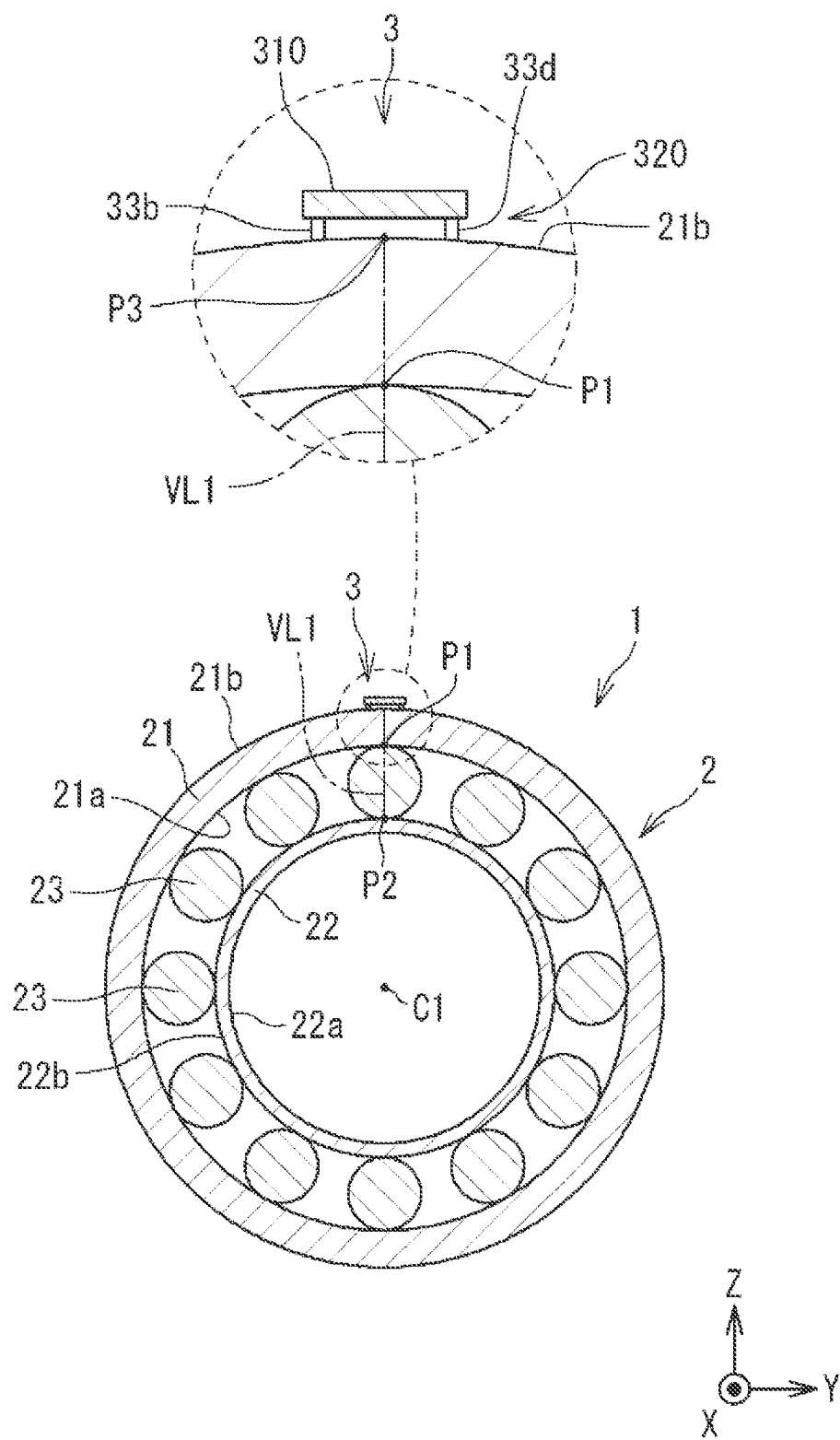
FIG. 1 is a cross-sectional view showing a rolling bearing device according to an embodiment in a cross-section along a plane (a YZ-plane) perpendicular to an axial direction.

FIG. 1 is a cross-sectional view showing a rolling bearing device 1 according to the embodiment, as a cross-section along a plane (a YZ-plane) perpendicular to an axial direction that will be described later. In FIG. 1, a part indicated as the cross-section is hatched. The rolling bearing device 1 includes a rolling bearing 2 and a strain detection unit 3. The rolling bearing 2 includes an outer ring 21, an inner ring 22, a plurality of rolling elements 23, and a cage (not shown) that retains the rolling elements 23. FIG. 1 also includes an enlarged view of a part of the rolling bearing device 1 that includes the strain detection unit 3.

In the present disclosure, a direction along a centerline C1 of the rolling bearing 2 (hereinafter referred to as "a bearing centerline C1") is an axial direction of the rolling bearing 2, which will be referred to simply as "the axial direction". The axial direction also includes a direction parallel to the bearing centerline C1 (an X-direction in FIG. 1). The sheet side of FIG. 1 is defined as one side in the axial direction, and the depth side of FIG. 1 is defined as the other side in the axial direction. A direction perpendicular to the bearing centerline C1 is a radial direction of the rolling bearing 2, which will be referred to simply as "the radial direction". A direction in which the rolling bearing 2 (the inner ring 22 in the first embodiment) rotates around the bearing centerline C1 is a circumferential direction of the rolling bearing 2, which will be referred to simply as "the circumferential direction".

The outer ring 21 is an annular fixed ring, and has an inner peripheral surface 21a and an outer peripheral surface 21b. The strain detection unit 3 is attached to the outer peripheral surface 21b of the outer ring 21. The outer peripheral surface 21b-side of the outer ring 21 is fixed to a housing (not shown). The inner ring 22 is an annular rotary ring, and has an inner peripheral surface 22a and an outer peripheral surface 22b. The inner peripheral surface 22a-side of the inner ring 22 is fixed to a rotary shaft (not shown). The rolling elements 23 are interposed between the inner peripheral surface 21a of the outer ring 21 and the outer peripheral surface 22b of the inner ring 22, and roll on the inner peripheral surface 21a and the outer peripheral surface 22b.

The inner peripheral surface 21a of the outer ring 21 has shoulders 21a1 and a first raceway surface 21a2. The shoulders 21a1 are positioned at end portions on one side and the other side in the axial direction, respectively. The first raceway surface 21a2 is positioned inward of the shoulders 21a1 in the axial direction, and is recessed outward from the shoulders 21a1 in the radial direction. The first raceway surface 21a2 serves as a track on which the rolling elements 23 roll.

The outer peripheral surface 22b of the inner ring 22 has shoulders 22b1 and a second raceway surface 22b2. The shoulders 22b1 are positioned at end portions on one side and the other side in the axial direction, respectively. The second raceway surface 22b2 is positioned inward of the shoulders 22b1 in the axial direction, and is recessed inward from the shoulders 22b1 in the radial direction. The second raceway surface 22b2 serves as a track on which the rolling elements 23 roll.

The inner ring 22 may not necessarily be annular, and may be, for example, an inner shaft having a solid structure (e.g., a hub shaft). The outer ring 21 may be a rotary ring, and the inner ring 22 may be a fixed ring. The rolling elements 23 are balls in the present embodiment. The rolling elements 23 may be rollers. The rolling bearing 2 of the present embodiment is of single-row type, but may be of double-row type.

The strain detection unit 3 may be attached to the inner peripheral surface 22a of the inner ring 22. One of the outer peripheral surface 21b of the outer ring 21 and the inner peripheral surface 22a of the inner ring 22, to which the strain detection unit 3 is attached, will be referred to simply as "the peripheral surface" as appropriate.

A point where one of the rolling elements 23 contacts the first raceway surface 21a2 at a certain timing will be referred to as "a first point P1". A point where the one rolling element 23 contacts the second raceway surface 22b2 at the timing will be referred to as "a second point P2". A virtual line passing through the first point P1 and the second point P2 will be referred to as "a virtual line VL1". A virtual intersection point where the virtual line VL1 and the outer peripheral surface 21b (the peripheral surface) intersect with each other will be referred to as "a virtual intersection point P3".

Figure 3:
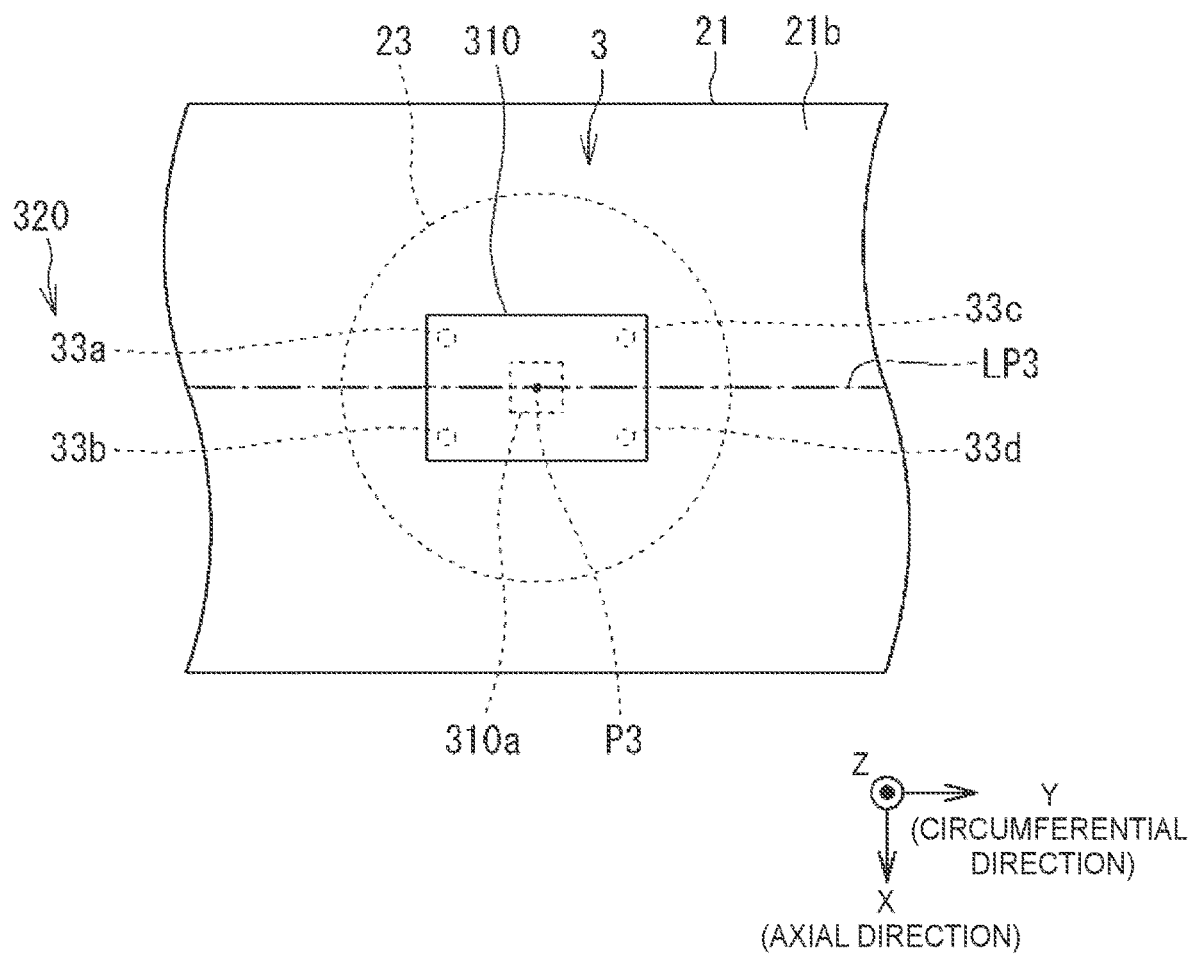
FIG. 3 is a plan view partially showing the rolling bearing device as viewed in a direction indicated by an arrow III of FIG. 2.

FIG. 2 is a cross-sectional view partially showing a cross-section of the rolling bearing device 1 along a ZX-plane on which the virtual line VL1 extends. FIG. 3 is a plan view partially showing the rolling bearing device 1 as viewed in a direction indicated by an arrow III of FIG. 2. In FIG. 3, the X-direction corresponds to the axial direction, and the Y-direction corresponds to the circumferential direction.

As shown in FIG. 2, the strain detection unit 3 includes a strain sensor 310 and a fixation portion 320. The strain sensor 310 is a sensor that detects a strain of the rolling bearing 2, and includes, for example, a region including a semiconductor sensor (a strain gauge) formed using a semiconductor (silicon) as a base material, and a region including wiring for outputting a detection signal of the semiconductor sensor. The semiconductor sensor is provided in a detection region 310a (FIG. 3) of the strain sensor 310. In other words, the detection region 310a includes the semiconductor sensor. In the present embodiment, the detection region 310a is positioned in a central part of the strain sensor 310 in a plan view obtained when the strain sensor 310 is viewed from outside in the radial direction. The detection region 310a may be positioned in a part offset from the central part of the strain sensor 310. The semiconductor sensor detects a displacement in at least one of the axial direction and the circumferential direction. As shown in FIGS. 1 and 2, the detection region 310a is spaced apart from the outer peripheral surface 21b. That is, the detection region 310a is "not fixed" to the outer peripheral surface 21b.

The detection region 310a may be in contact with the outer peripheral surface 21b, as long as the strain sensor 310 is fixed to the outer peripheral surface 21b at a position avoiding the detection region 310a. In this case, when the outer peripheral surface 21b is strained in at least one of the circumferential direction and the radial direction, the outer peripheral surface 21b elongates or contracts while being in slidable contact with a radially inner surface of the detection region 310a. In this state as well, the detection region 310a is "not fixed" to the outer peripheral surface 21b. That is, the state where the detection region 310a is "not fixed" to the outer peripheral surface 21b includes the state where the detection region 310a and the outer peripheral surface 21b are spaced apart from each other, and the state where the detection region 310a and the outer peripheral surface 21b are not spaced apart from each other but not joined to each other.

As shown in FIG. 3, the fixation portion 320 fixes the strain sensor 310 to the outer peripheral surface 21b of the outer ring 21. The fixation portion 320 includes a plurality of joint portions 33a, 33b, 33c, and 33d. The joint portions 33a, 33b, 33c, and 33d will be referred to simply as "the joint portions 33" in the case where the joint portions 33 are not distinguished from each other in particular. In the present embodiment, the four joint portions 33 are provided. For example, however, two, three, five, or more joint portions 33 may be provided. In the present embodiment, each of the four joint portions 33 has a columnar shape.

The joint portions 33 are joint parts that join the strain sensor 310 and the outer peripheral surface 21b to each other with the use of, for example, laser welding. When the strain sensor 310 and the outer peripheral surface 21b are joined to each other with the use of laser welding, the outer ring 21 may be used as a base material of the joint portions 33, or a joint material (e.g., a metal) prepared separately from the outer ring 21 may be used as a base material of the joint portions 33. When the strain sensor 310 and the outer peripheral surface 21b are joined to each other with the use of laser welding, the outer ring 21 may be irradiated with laser light from outside in the radial direction via the strain sensor 310, the laser light having such a wavelength that the laser light permeates the strain sensor 310 to be absorbed by the base material.

The four joint portions 33 are provided at a peripheral edge portion of the strain sensor 310. It should be noted herein that "the peripheral edge portion" is a part that is closer to an end of the strain sensor 310 than to the detection region 310a of the strain sensor 310. The joint portion 33a and the joint portion 33d are positioned to face each other across the detection region 310a. The joint portion 33b and the joint portion 33c are positioned to face each other across the detection region 310a. The detection region 310a is positioned on diagonals of a rectangle formed by the four joint portions 33.

In a plan view such as FIG. 3, the virtual intersection point P3 is positioned inside the detection region 310a. The joint portion 33a and the joint portion 33d are positioned to face each other across the virtual intersection point P3. The joint portion 33b and the joint portion 33c are positioned to face each other across the virtual intersection point P3. The virtual intersection point P3 is positioned at an intersection point of the diagonals of the rectangle formed by the four joint portions 33.

As described above, the rolling bearing device 1 according to the present embodiment includes the rolling bearing 2, the strain sensor 310, and the fixation portion 320. The rolling bearing 2 includes the outer ring 21 having the inner peripheral surface 21a on which the first raceway surface is provided, the inner ring 22 having the outer peripheral surface 22b on which the second raceway surface is provided, and the rolling elements 23 interposed between the first raceway surface and the second raceway surface. The strain sensor 310 detects the strain of the rolling bearing 2. The fixation portion 320 fixes the strain sensor 310 to a peripheral surface that includes at least one of the outer peripheral surface 21b of the outer ring 21 and the inner peripheral surface 22a of the inner ring 22. The fixation portion 320 fixes at least two locations in the strain sensor 310 that are positioned to face each other across the detection region 310a of the strain sensor 310, to the peripheral surface, with the detection region 310a and the peripheral surface spaced apart from each other.

Operation and Effect of Rolling Bearing Device

When a load is applied to the rolling bearing 2 from the rotary shaft, the inner ring 22 and the outer ring 21 are partially elongated (i.e., strained) in at least one of the axial direction and the circumferential direction. It should be noted herein that "the load" includes at least one of "an axial load" and "a thrust load". The strain detection unit 3 is elongated in at least one of the axial direction and the circumferential direction, as the outer ring 21 (or the inner ring 22) is strained.

It should be noted herein that the fixation portion 320 according to the present embodiment fixes at least two locations in the strain sensor 310 that are positioned to face each other across the detection region 310a, to the outer peripheral surface 21b. Therefore, the fixation portion 320 itself is unlikely to be elongated in the axial direction or the circumferential direction due to a stress. The fixation portion 320 can transmit, to the strain sensor 310, a force for elongation in at least one of the axial direction and the circumferential direction, the force being transmitted from the outer peripheral surface 21b.

When the detection region 310a of the strain sensor 310 faces a part of the outer peripheral surface 21b where a larger strain is produced, the strain sensor 310 can detect the strain with higher sensitivity. The fixation portion 320 fixes the strain sensor 310 and the outer peripheral surface 21b to each other at a position avoiding that part, such that the detection region 310a of the strain sensor 310 faces the outer peripheral surface 21b. Therefore, the stress produced at the fixation portion 320 can be made smaller than in the case where the strain sensor 310 and the outer peripheral surface 21b are entirely fixed to each other. Thus, the durability of the fixation portion 320 can be further enhanced.

When the outer peripheral surface 21b is strained in such a direction that the outer peripheral surface 21b is elongated, the strain sensor 310 is pulled between adjacent ones of the joint portions 33, and thus, the strain produced in the strain sensor 310 can be further increased. In particular, the detection region 310a of the strain sensor 310 is positioned between adjacent ones of the joint portions 33, and thus, the strain sensor 310 can detect the strain with higher sensitivity.

As shown in FIG. 2, the load from the rotary shaft tends to be applied more to a part of the outer ring 21, which is positioned directly above a center C2 of the rolling element 23. More specifically, the virtual line VL1 passing through the first point P1 and the second point P2 passes through the center C2 of the rolling element 23. Moreover, the virtual intersection point P3 of the virtual line VL1 and the outer ring 21 is positioned directly above the center C2 of the rolling element 23. That is, the strain in the part of the outer peripheral surface 21b including the virtual intersection point P3 tends to be larger than the strain in the other parts of the outer peripheral surface 21b.

In the rolling bearing device 1 according to the present embodiment, the detection region 310a faces the virtual intersection point P3 in the radial direction. Therefore, the detection region 310a is elongated more, and the strain produced in the strain sensor 310 can be further increased. Thus, the strain sensor 310 can detect the strain with higher sensitivity.

In the rolling bearing device 1, the rolling elements 23 move in the circumferential direction when the inner ring 22 rotates. Therefore, the virtual intersection point P3 also moves in the circumferential direction as time passes. FIG. 3 shows the state of the rolling bearing device 1 at a certain timing. In reality, the virtual intersection point P3 is positioned on a line extending in the circumferential direction, such as a virtual line LP3.

In the present embodiment, the strain detection unit 3 is provided at a position facing the virtual intersection point P3 in the radial direction at the certain timing. Besides, the strain detection unit 3 is provided directly above the bearing centerline C1 in the vertical direction. However, the strain detection unit 3 may not necessarily be provided in the area shown in FIG. 3 in the rolling bearing 2. The strain detection unit 3 may be provided in an area spaced apart from the area shown in FIG. 3 in the circumferential direction.

MODIFICATION EXAMPLES

The rolling bearing device 1 according to the embodiment of the disclosure has been described above. However, the embodiment of the disclosure is not limited to the foregoing description, and can be subjected to various modifications. Modification examples of the embodiment of the disclosure will be described hereinafter. Components that are identical to those of the embodiment are denoted by the same reference symbols respectively, and the description thereof will be omitted hereinafter.

First Modification Example

The fixation portion 320 according to the embodiment includes the four joint portions 33, and four corners of the strain sensor 310 are joined to the outer peripheral surface 21b by the four joint portions 33 respectively. However, as shown in FIGS. 4A, 4B, and 4C, the fixation portion may have another shape, or may be provided in another area.

FIGS. 4A, 4B, and 4C are plan views showing strain detection units 3a, 3b, and 3c according to a first modification example, respectively. The strain detection units 3a, 3b, and 3c include fixation portions 321, 322, and 323 respectively. Each of FIGS. 4A, 4B, and 4C is a plan view of the rolling bearing device 1 as viewed in the same direction as in FIG. 3.

As shown in FIG. 4A, the fixation portion 321 includes two joint portions 33e and 33f. Each of the joint portions 33e and 33f has a shape that is long in the circumferential direction of the rolling bearing 2 and that is short in the axial direction of the rolling bearing 2. The length of each of the joint portions 33e and 33f in the circumferential direction is, for example, equal to or larger than a half of the length of the strain sensor 310 in the circumferential direction. The joint portions 33e and 33f are spaced apart from each other in the axial direction and positioned parallel to each other. The strain sensor 310 is not in contact with the outer peripheral surface 21b, at a position between the joint portions 33e and 33f. The detection region 310a of the strain sensor 310 and the virtual intersection point P3 are positioned between the joint portions 33e and 33f.

The joint portions 33e and 33f face each other in the axial direction, and thus, the strain produced on the outer peripheral surface 21b in the axial direction is likely to be transmitted to the strain sensor 310. Therefore, the strain sensor 310 can preferentially detect the strain produced in the axial direction on the outer peripheral surface 21b. Besides, each of the joint portions 33e and 33f has a shape that is long in the circumferential direction, and thus, the outer peripheral surface 21b and the strain sensor 310 can be easily joined to each other through the use of, for example, laser welding.

As shown in FIG. 4B, the fixation portion 322 is different from the fixation portion 321 in the direction in which the joint portions 33 extend, and is identical thereto in the other respects. The fixation portion 322 includes two joint portions 33g and 33h. Each of the joint portions 33g and 33h has a shape that is long in the axial direction of the rolling bearing 2 and that is short in the circumferential direction of the rolling bearing 2. The fixation portion 322 according to the present modification example allows the strain sensor 310 to preferentially detect the strain produced in the circumferential direction on the outer peripheral surface 21b.

As shown in FIG. 4C, the fixation portion 323 is different from the fixation portion 320 in the area where the joint portions 33 are arranged, and is identical thereto in the other respects. The fixation portion 323 includes the four joint portions 33a, 33b, 33c, and 33d. The four corners of the strain sensor 310 are joined by the four joint portions 33 of the fixation portion 320. However, the four joint portions 33 of the fixation portion 323 are respectively positioned inward of the four corners of the strain sensor 310 in the circumferential direction. In particular, the four joint portions 33 are respectively positioned at the same positions as or inward of circumferential ends of the detection region 310a of the strain sensor 310, in the circumferential direction.

In the strain sensor 310, the strain transmitted from the outer peripheral surface 21b is produced among the joint portions 33. With the fixation portion 323, the strain can be intensively transmitted to the detection region 310a of the strain sensor 310, the detection region 310a including a semiconductor sensor. Therefore, the strain sensor 310 can detect the strain with higher sensitivity.

Second Modification Example

The strain detection unit 3 according to the embodiment includes the strain sensor 310 directly fixed to the outer peripheral surface 21b by the fixation portion 320. The strain sensor 310 has the shape of a single plate, and includes a strain gauge in the detection region 310a. However, as shown in FIGS. 5, 6, and 7, a member serving as a buffer (an intermediate member 34 that will be described later) may be provided between the strain gauge and the outer peripheral surface 21b.

Figure 5:
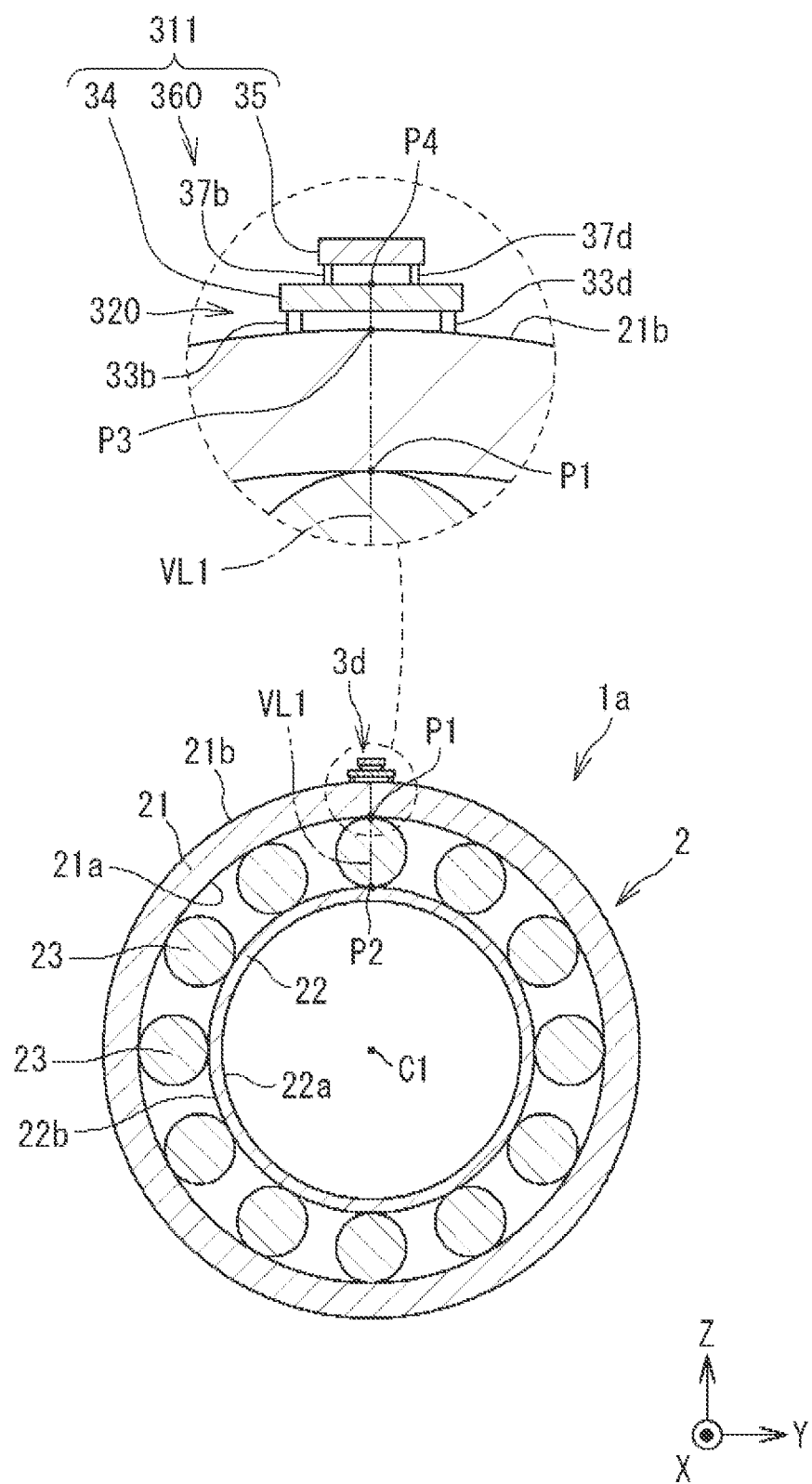
FIG. 5 is a cross-sectional view showing a rolling bearing device according to a second modification example, as a cross-section along a plane (a YZ-plane) perpendicular to an axial direction.

FIG. 5 is a cross-sectional view showing a rolling bearing device 1a according to a second modification example in a cross-section along a plane (a YZ-plane) perpendicular to the axial direction. FIG. 6 is a cross-sectional view partially showing the cross-section of the rolling bearing device 1a on a ZX-plane on which the virtual line VL1 extends. FIG. 7 is a plan view partially showing the rolling bearing device 1a as viewed in a direction indicated by an arrow VII of FIG. 6.

The rolling bearing device 1a includes the rolling bearing 2 and a strain detection unit 3d. The strain detection unit 3d includes the fixation portion 320 and a strain sensor 311. The strain sensor 311 includes the intermediate member 34, a chip 35, and a second fixation portion 360 configured to fix the chip 35 to the intermediate member 34.

Figure 6:
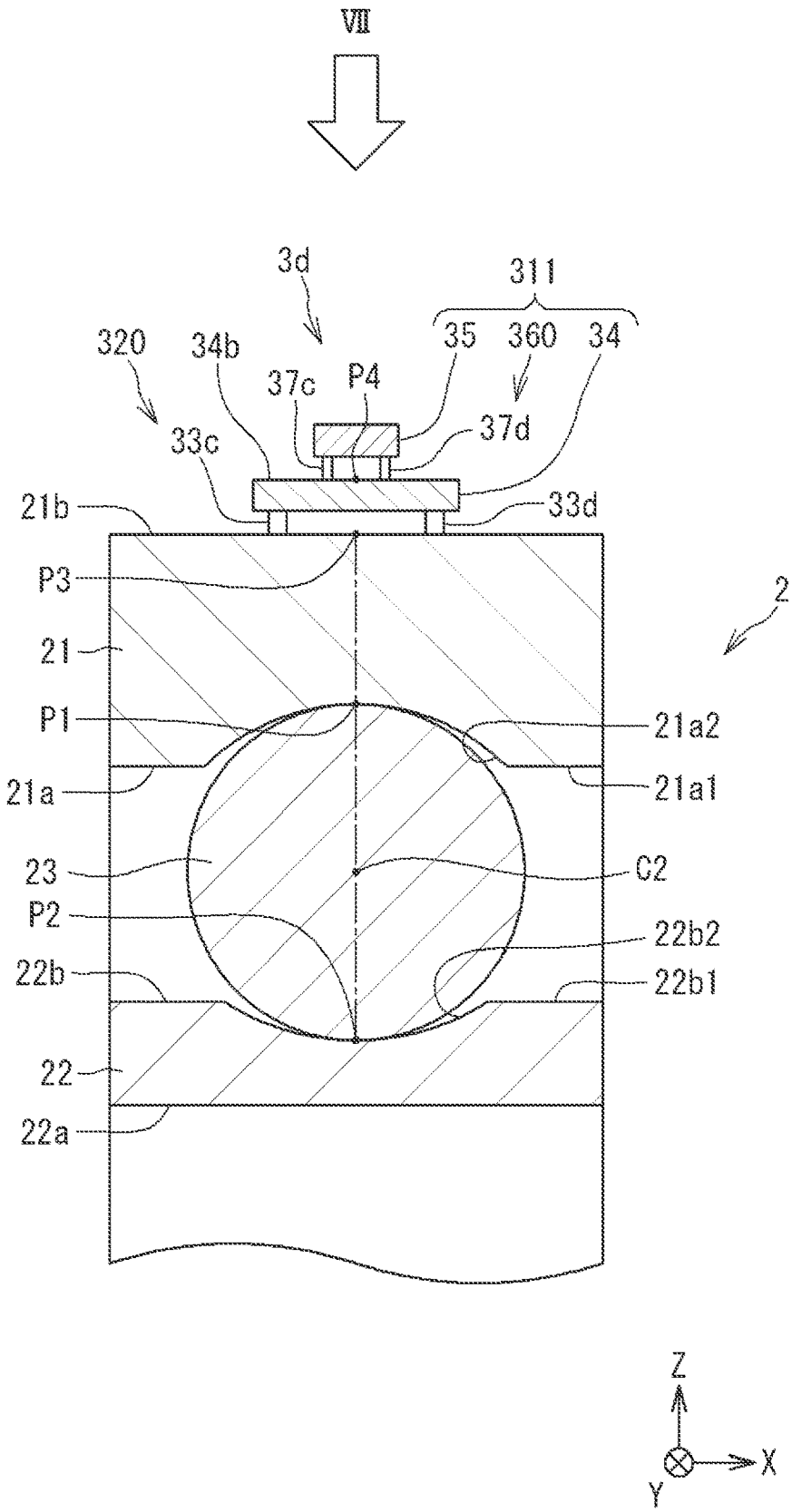
FIG. 6 is a cross-sectional view partially showing the cross-section of the rolling bearing device according to the second modification example.
Figure 7:
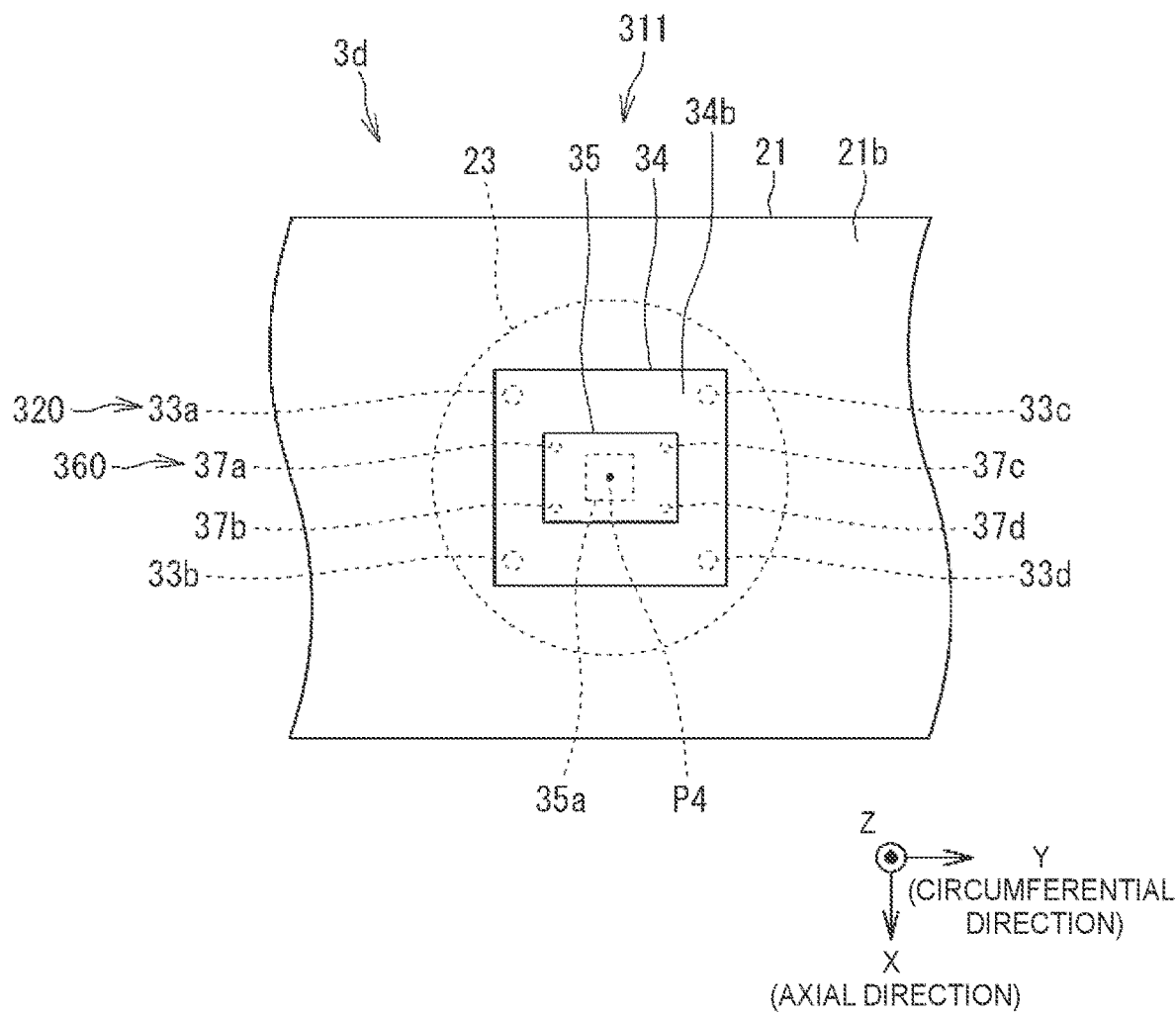
FIG. 7 is a plan view partially showing the rolling bearing device according to the second modification example.

As shown in FIG. 6, the intermediate member 34 is a plate-shaped piece of metal (e.g., copper) that is thin in the radial direction and that is quadrangular (e.g., rectangular) in the axial direction and the circumferential direction. The intermediate member 34 is resilient (elastic) in the axial direction and the circumferential direction. The intermediate member 34 has two surfaces positioned in the radial direction, namely, a first surface 34a located on the side of the peripheral surface of the rolling bearing 2, and a second surface 34b located on the side opposite to the first surface 34a. Part of the first surface 34a is in contact with the fixation portion 320. A virtual intersection point where the second surface 34b and the virtual line VL1 intersect with each other will be referred to as "a virtual intersection point P4".

The chip 35 includes a strain gauge in a detection region 35a. In other words, the detection region 35a includes the strain gauge. In the present modification example, the detection region 35a is positioned in a central part of the chip 35 in a plan viewed obtained when the chip 35 is viewed from outside in the radial direction. The detection region 35a may be positioned in a part offset from the central part of the chip 35. The strain gauge detects, as a strain, a displacement in at least one of the axial direction and the circumferential direction. The chip 35 is fixed to the second surface 34b of the intermediate member 34 by the second fixation portion 360. The detection region 35a (FIG. 7) of the chip 35 is spaced apart from the second surface 34b of the intermediate member 34. That is, the detection region 35a and the second surface 34b are not fixed to each other.

As shown in FIG. 7, the second fixation portion 360 fixes the chip 35 to the second surface 34b of the intermediate member 34. The second fixation portion 360 includes a plurality of second joint portions 37a, 37b, 37c, and 37d. The second joint portions 37a, 37b, 37c, and 37d will be referred to simply as "the second joint portions 37" in the case where the second joint portions 37 are not distinguished from each other in particular. In the present modification example, the four second joint portions 37 are provided. For example, however, two, three, five, or more second joint portions 37 may be provided.

The second joint portions 37 are joint parts that join the chip 35 and the second surface 34b of the intermediate member 34 to each other through the use of, for example, soldering or laser welding. When the chip 35 and the second surface 34b are joined to each other through the use of laser welding, the intermediate member 34 may be used as a base material of the second joint portions 37, or a joint material (e.g., a metal) prepared separately from the intermediate member 34 may be used as a base material of the second joint portions 37.

Each of the four second joint portions 37 is provided at a peripheral edge portion of the chip 35. The second joint portion 37a and the second joint portion 37d are positioned to face each other across the detection region 35a. The second joint portion 37b and the second joint portion 37c are positioned to face each other across the detection region 35a. The detection region 35a is positioned on diagonals of a rectangle formed by the four second joint portions 37. In a plan view such as FIG. 7, the virtual intersection point P4 is positioned inside the detection region 35a. The virtual intersection point P4 is positioned on an intersection point of the diagonals of the rectangle formed by the four second joint portions 37.

As described above, the rolling bearing device 1a according to the second modification example includes the rolling bearing 2, the strain sensor 311 that detects the strain of the rolling bearing 2, and the fixation portion 320 configured to fix the strain sensor 311 to a peripheral surface that includes at least one of the outer peripheral surface 21b of the outer ring 21 and the inner peripheral surface 22a of the inner ring 22. The strain sensor 311 includes the plate-shaped intermediate member 34 and the strain gauge. The first surface 34a of the intermediate member 34 on one side is in contact with the fixation portion 320. The strain gauge is fixed to the second surface 34b of the intermediate member 34 on the other side.

With the rolling bearing device 1a, the chip 35 including the strain gauge is fixed to the peripheral surface of the rolling bearing 2 via the intermediate member 34. Even in the case where it is difficult to directly join the chip 35 to the peripheral surface of the rolling bearing 2, the chip 35 can be indirectly joined to the peripheral surface of the rolling bearing 2 by using the intermediate member 34 that can be easily joined to both the chip 35 and the peripheral surface, as a buffer.

The second fixation portion 360 can release the stress transmitted from the second surface 34b of the intermediate member 34 to the chip 35, through the same effect as that of the fixation portion 320. Therefore, the stress produced at the second fixation portion 360 can be further reduced, and the durability of the second fixation portion 360 can be further enhanced.

When the second surface 34b of the intermediate member 34 is strained in a direction in which the second surface 34b is elongated, the chip 35 is pulled between adjacent ones of the second joint portions 37, and thus, the strain produced in the chip 35 can be further increased. In particular, the detection region 35a of the chip 35 is positioned between adjacent ones of the second joint portions 37, and thus, the chip 35 can detect the strain with higher sensitivity.

Third Modification Example

Figure 8A:
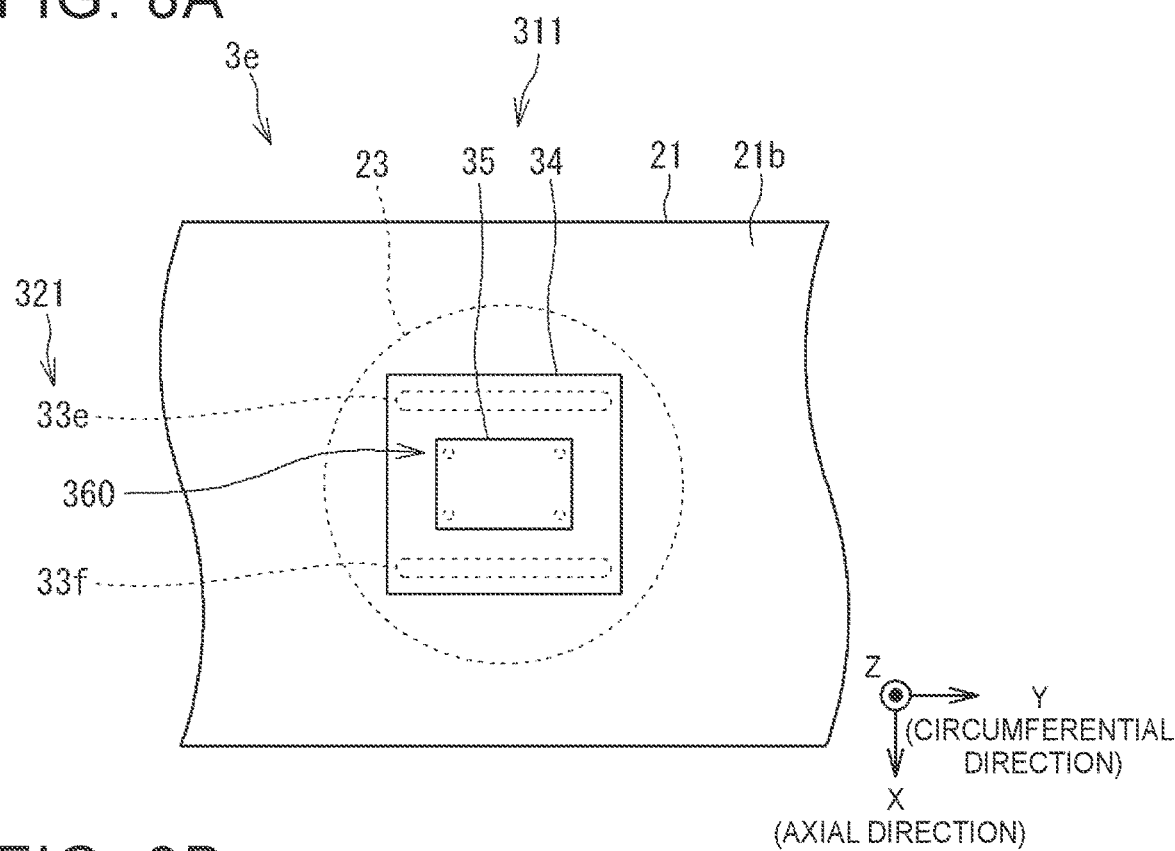
FIG. 8A is a plan view showing a strain detection unit according to a third modification example.
Figure 8B:
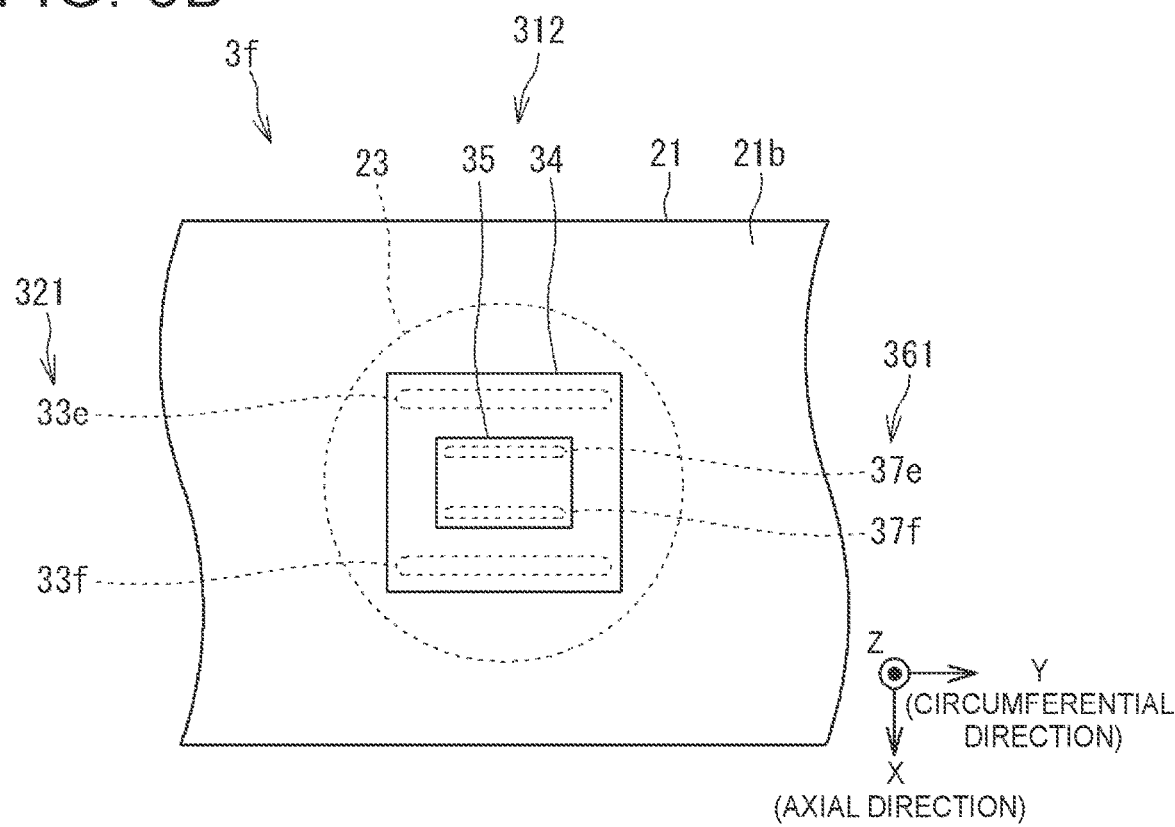
FIG. 8B is another plan view showing the strain detection unit according to the third modification example.

FIGS. 8A and 8B are plan views showing strain detection units 3e and 3f according to the third modification example, respectively. The third modification example is obtained by further modifying the strain detection unit 3d according to the second modification example. FIGS. 8A and 8B are plan views of the rolling bearing device 1a as viewed in the same direction as in FIG. 7.

As shown in FIG. 8A, the strain detection unit 3e includes the strain sensor 311 and the fixation portion 321. The strain sensor 311 has the same configuration as that of the strain sensor 311 according to the second modification example, and the fixation portion 321 has the same configuration as that of the fixation portion 321 according to the first modification example. That is, FIG. 8A shows the modification example obtained by combining the first modification example and the second modification example with each other. With this configuration, the strain sensor 311 can preferentially detect the strain produced in the axial direction on the outer peripheral surface 21b, while the chip 35 is indirectly joined to the peripheral surface of the rolling bearing 2.

As shown in FIG. 8B, the strain detection unit 3f includes a strain sensor 312 and the fixation portion 321. The strain sensor 312 includes the chip 35 and a second fixation portion 361. The second fixation portion 361 includes two second joint portions 37e and 37f. Each of the second joint portions 37e and 37f has a shape that is long in the circumferential direction of the rolling bearing 2 and that is short in the axial direction of the rolling bearing 2. With the second fixation portion 361 according to the present modification example, the chip 35 can preferentially detect the strain produced in the axial direction on the second surface 34b of the intermediate member 34.

Fourth Modification Example

In the above-mentioned embodiment, the single strain detection unit 3 is attached to the single rolling bearing 2 to detect the strain of the rolling bearing 2. However, as shown in FIG. 9, the (e.g., three) strain detection units 3, 3a, and 3b may be attached to the single rolling bearing 2 to detect the strains of the rolling bearing 2 respectively.

FIG. 9 is a plan view of a rolling bearing device 1b when viewed in the same direction as in FIG. 3. The rolling bearing device 1b includes the rolling bearing 2 and the three strain detection units 3, 3a, and 3b. The strain detection unit 3 has the same configuration as that of the strain detection unit 3 according to the embodiment. The strain detection units 3a and 3b have the same configurations as those of the strain detection units 3a and 3b according to the first modification example, respectively. The three strain detection units 3, 3a, and 3b are arranged along the circumferential direction. The three strain detection units 3, 3a, and 3b are arranged at the same position in the axial direction.

The strain sensor 310 of the strain detection unit 3a will be referred to hereinafter as "a first strain sensor 31a", the strain sensor 310 of the strain detection unit 3b will be referred to hereinafter as "a second strain sensor 31b", and the strain sensor 310 of the strain detection unit 3 will be referred to hereinafter as "a third strain sensor 31c".

The first strain sensor 31a is fixed to the peripheral surface by the two joint portions 33 each having a shape that is long in the circumferential direction. Therefore, the first strain sensor 31a preferentially detects the strain produced in the axial direction on the peripheral surface of the rolling bearing 2. The second strain sensor 31b is fixed to the peripheral surface by the two joint portions 33 each having a shape that is long in the axial direction. Therefore, the second strain sensor 31b preferentially detects the strain produced in the circumferential direction on the peripheral surface of the rolling bearing 2.

Four corners of the third strain sensor 31c are fixed to the peripheral surface by the four columnar joint portions 33 respectively. Therefore, the third strain sensor 31c equally detects the strain produced in the axial direction and the strain produced in the circumferential direction on the peripheral surface of the rolling bearing 2.

With the rolling bearing device 1b, the strain of the rolling bearing 2 can be detected as a component in the axial direction and a component in the circumferential direction by the first strain sensor 31a and the second strain sensor 31b. Thus, the state of the rolling bearing 2 can be detected in more detail.

Fifth Modification Example

Figure 10A:
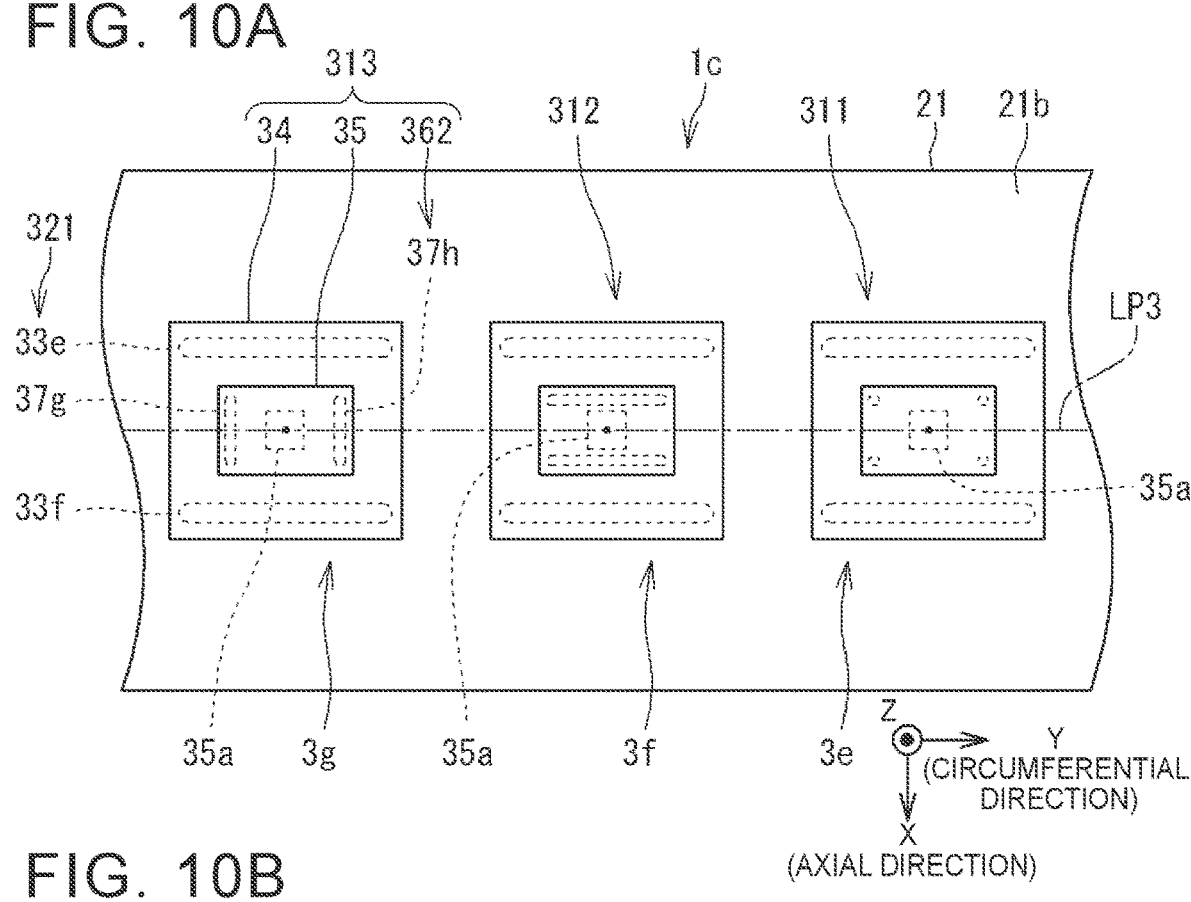
FIG. 10A is a plan view partially showing a rolling bearing device according to a fifth modification example.
Figure 10B:
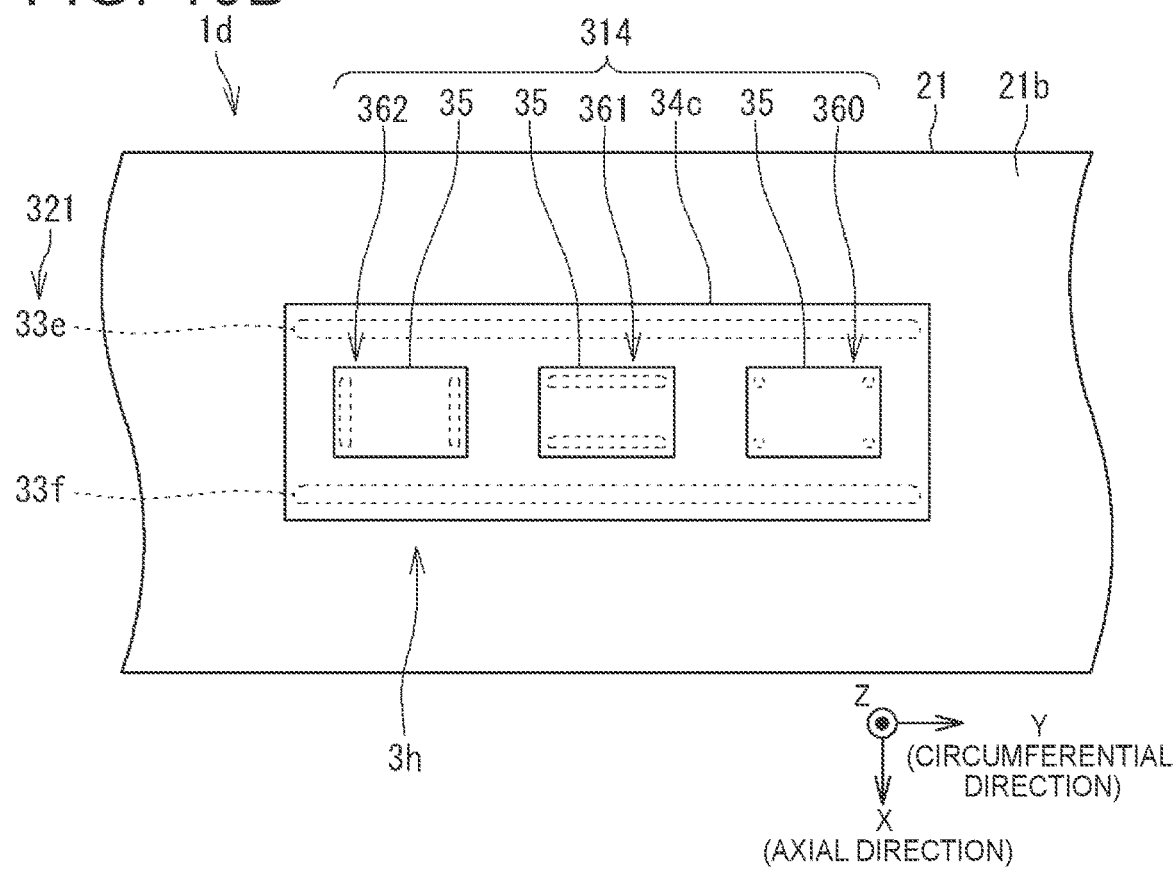
FIG. 10B is another plan view partially showing the rolling bearing device according to the fifth modification example.

In the fourth modification example, the single rolling bearing is provided with the strain sensors. In such a configuration, a strain sensor including the intermediate member 34 may be provided as in the second modification example. Besides, a plurality of chips may be mounted on the single intermediate member. FIGS. 10A and 10B are plan views of rolling bearing devices 1c and 1d when viewed in the same direction as in FIG. 7.

As shown in FIG. 10A, the rolling bearing device 1c includes the rolling bearing 2 and three strain detection units, namely, the strain detection units 3e and 3f and a strain detection unit 3g. The strain detection units 3e and 3f have the same configurations as those of the strain detection units 3e and 3f according to the third modification example, respectively. The strain detection unit 3g includes a strain sensor 313 and the fixation portion 321. The strain sensor 313 includes the chip 35, the intermediate member 34, and a second fixation portion 362 configured to fix the chip 35 to the second surface 34b of the intermediate member 34.

The fixation portion 362 includes two second joint portions 37g and 37h. Each of the second joint portions 37g and 37h has a shape that is long in the axial direction of the rolling bearing 2 and that is short in the circumferential direction of the rolling bearing 2. With the second fixation portion 362 according to the present modification example, the chip 35 can preferentially detect the strain produced in the circumferential direction on the second surface 34b of the intermediate member 34.

As shown in FIG. 10B, the rolling bearing device 1d includes the rolling bearing 2 and a strain detection unit 3h. The strain detection unit 3h includes a strain sensor 314 and the fixation portion 321. The strain sensor 314 includes a single intermediate member 34c, three chips 35, and the three second fixation portions 360, 361, and 362 configured to fix the three chips 35 to the intermediate member 34c respectively. On the intermediate member 34c, the chips 35 are arranged along the circumferential direction. Therefore, the intermediate member 34c has a shape that is longer than the intermediate member 34 according to the second modification example in the circumferential direction.

Sixth Modification Example

Figure 11:
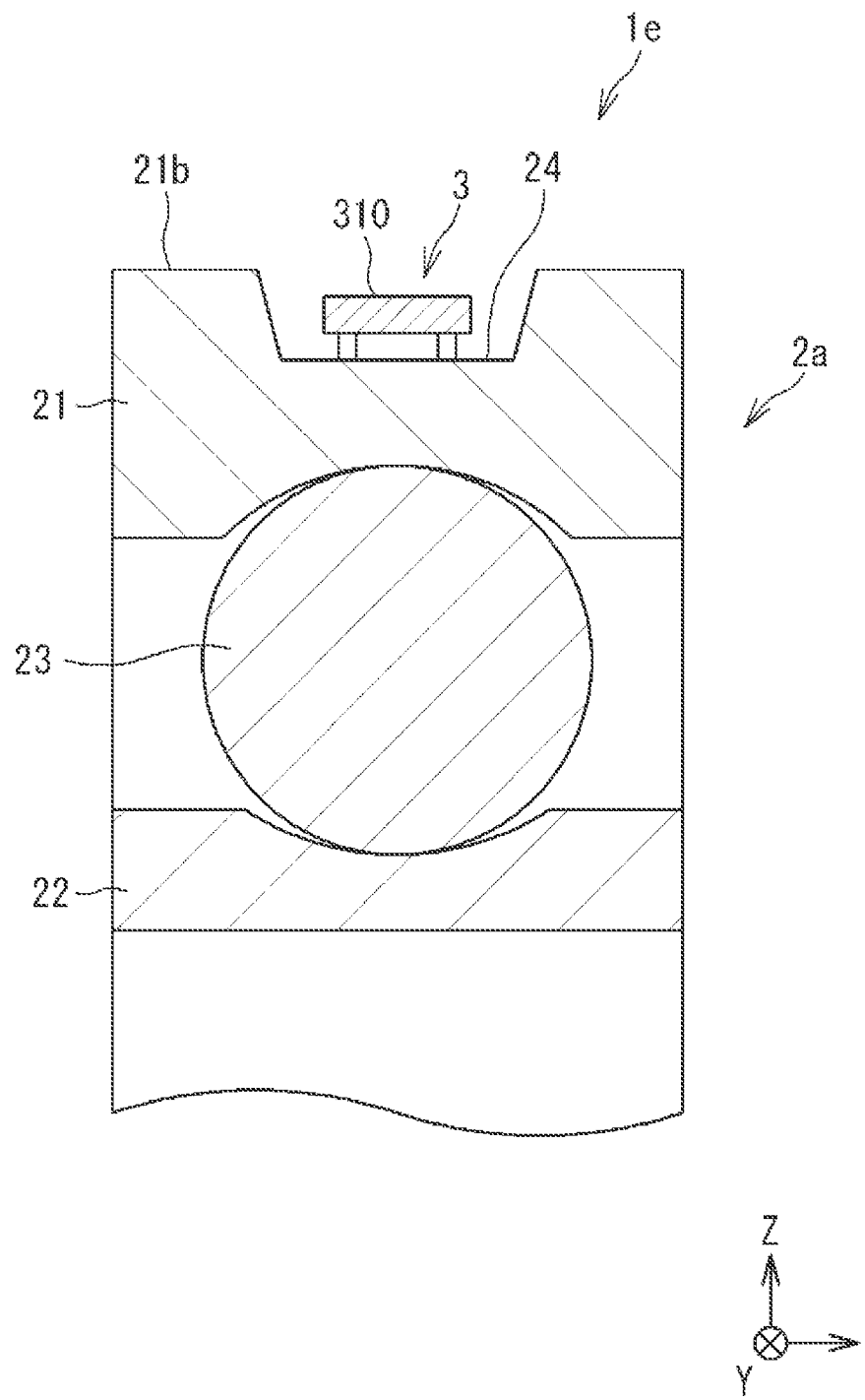
FIG. 11 is a cross-sectional view partially showing a rolling bearing device according to a sixth modification example.

FIG. 11 is a cross-sectional view partially showing a cross-section of a rolling bearing device 1e according to the sixth modification example where the virtual line VL1 extends. The rolling bearing device 1e includes a rolling bearing 2a and the strain detection unit 3. The rolling bearing 2a is different from the rolling bearing 2 according to the embodiment in that a groove portion 24 is provided in the outer peripheral surface 21b of the outer ring 21, and is identical thereto in the other respects.

The strain detection unit 3 is attached to the groove portion 24. The radially outer surface of the strain detection unit 3 is positioned inward of the outer peripheral surface 21b in the radial direction. That is, the strain detection unit 3 is completely accommodated in the groove portion 24, and does not protrude outward from the outer peripheral surface 21b in the radial direction. With this configuration, the strain detection unit 3 does not collide with a housing (not shown) when the outer peripheral surface 21b of the outer ring 21 is fitted to the housing. Therefore, the outer peripheral surface 21b of the outer ring 21 can be easily fitted to the housing.

Seventh Modification Example

Figure 12A:
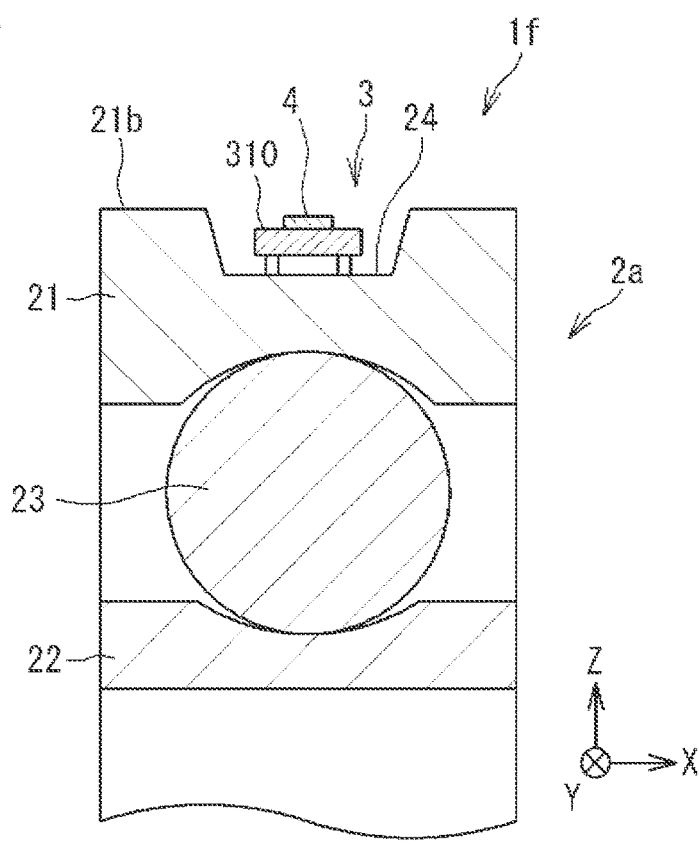
FIG. 12A is an illustrative view illustrating a rolling bearing device according to a seventh modification example.
Figure 12B:
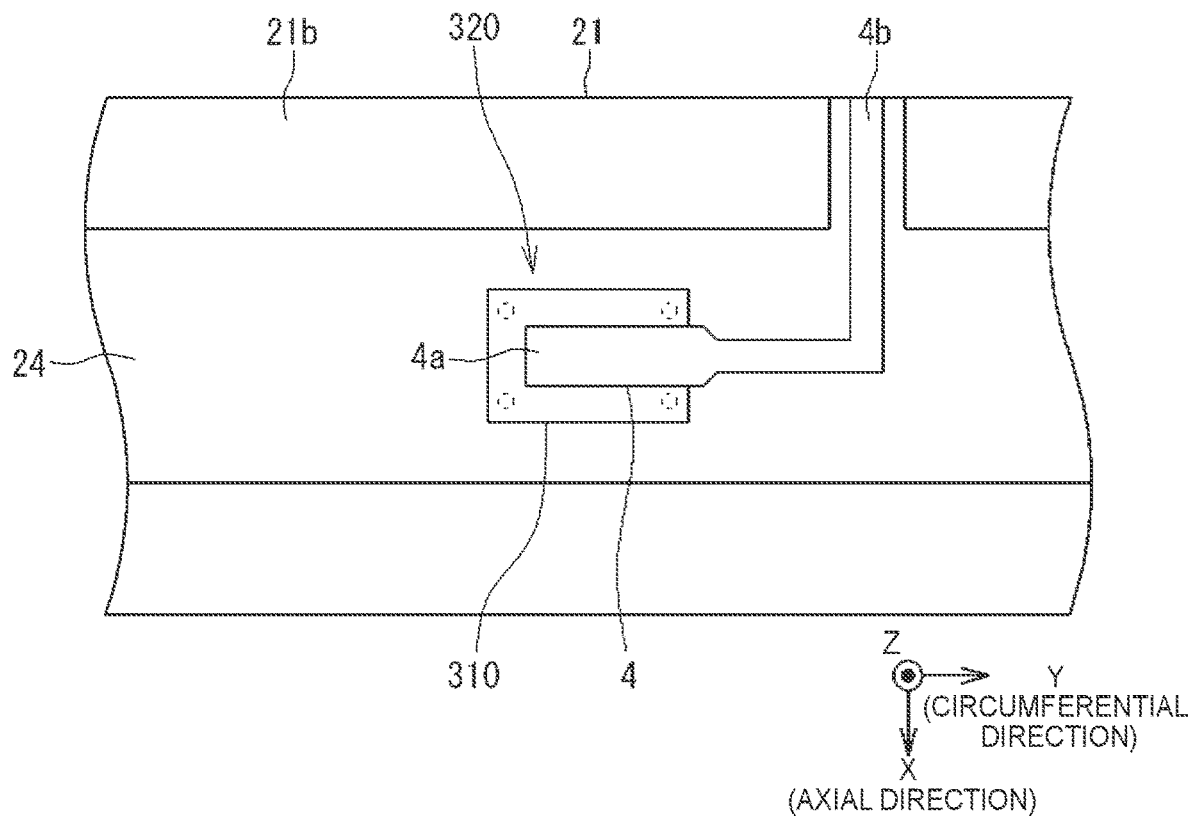
FIG. 12B is another illustrative view illustrating the rolling bearing device according to the seventh modification example.

FIGS. 12A and 12B are illustrative views illustrating a rolling bearing device 1f according to the seventh modification example. FIG. 12A is a cross-sectional view partially showing a cross-section of the rolling bearing device 1f along the ZX-plane where the virtual line VL1 extends. FIG. 12B is a plan view partially showing the rolling bearing device 1f when viewed in the same direction as in FIG. 3. In the present modification example, an example of a configuration in which a detection signal of the strain detection unit 3 is taken out will be described.

The rolling bearing device 1f includes the rolling bearing 2a, the strain detection unit 3, and a cable 4 configured to output the detection signal of the strain detection unit 3 to the outside of the rolling bearing device 1f. The groove portion 24 is provided in the outer peripheral surface 21b in such a manner as to be long in the circumferential direction. The groove portion 24 may be provided entirely in the outer peripheral surface 21b, or may be provided in part of the outer peripheral surface 21b.

The cable 4 is, for example, a flat cable. One end 4a of the cable 4 is connected to the radially outer surface of the strain sensor 310. The other end 4b of the cable 4 is connected, via a part of the groove portion 24 provided to extend from a central portion of the outer peripheral surface 21b in the axial direction to the other side (or one side) of the outer peripheral surface 21b in the axial direction, to the end of the rolling bearing 2a on the other side in the axial direction. The detection signal of the strain detection unit 3 is output from the other end 4b to the outside of the rolling bearing device if (e.g., to the housing). The strain detection unit 3 and the cable 4 are completely accommodated in the groove portion 24, and does not protrude outward from the outer peripheral surface 21b in the radial direction.

Eighth Modification Example

Figure 13A:
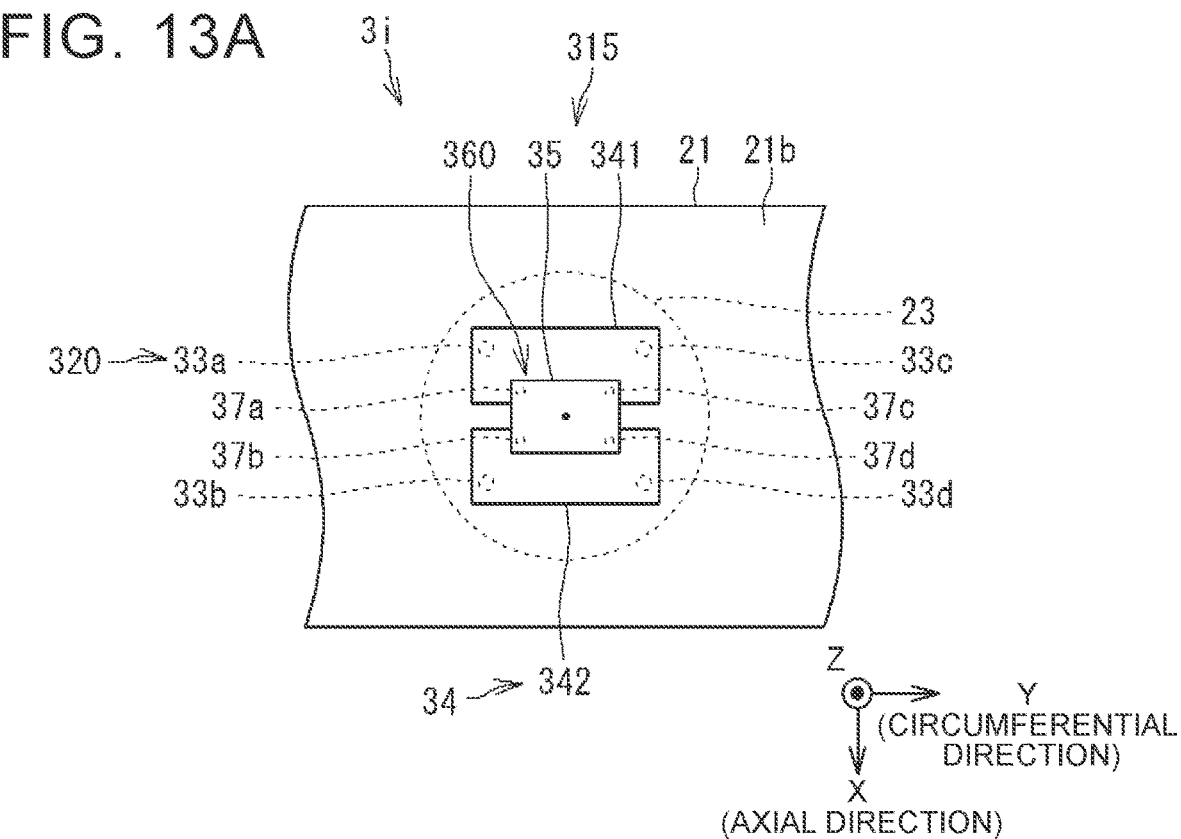
FIG. 13A is an illustrative view illustrating a strain detection unit according to an eighth modification example.
Figure 13B:
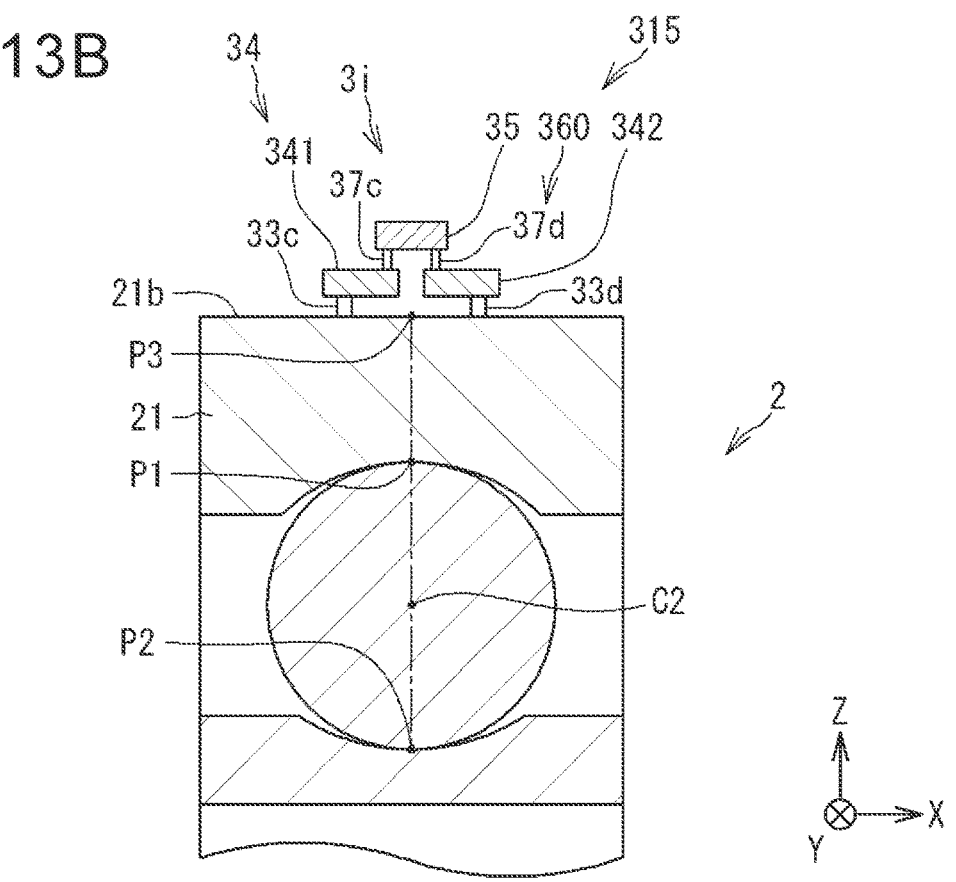
FIG. 13B is another illustrative view illustrating the strain detection unit according to the eighth modification example.

FIGS. 13A and 13B are illustrative views of a strain detection unit 3i according to the eighth modification example. The present modification example is obtained by further modifying the second modification example. FIG. 13A is a plan view including the strain detection unit 3i when viewed in the same direction as in FIG. 3. FIG. 13B is a cross-sectional view including the strain detection unit 3i cut along the same plane as in FIG. 2. The strain detection unit 3i according to the present modification example includes a strain sensor 315 and the fixation portion 320.

In the above-mentioned second modification example, the intermediate member 34 is a single plate. However, the intermediate member 34 may include two split members 341 and 342 that are provided separately from each other, while being positioned to face each other across the detection region 35a of the chip 35. In the present modification example, the strain sensor 315 includes the chip 35, the split members 341 and 342, and the second fixation portion 360.

Each of the split members 341 and 342 is a metal plate (e.g., a copper plate or a copper foil) that is long in the circumferential direction. The split members 341 and 342 are provided apart from each other in the axial direction. The second joint portions 37b and 37d of the second fixation portion 360 positioned on one side in the axial direction connect the chip 35 and the split member 342 to each other. Besides, the second joint portions 37a and 37c of the second fixation portion 360 positioned on the other side in the axial direction connect the chip 35 and the split member 341 to each other. That is, the second fixation portion 360 fixes each of the two split members 341 and 342 to the chip 35.

The joint portions 33b and 33d of the fixation portion 320 positioned on one side in the axial direction connect the outer peripheral surface 21b of the outer ring 21 and the split member 342 to each other. Besides, the joint portions 33a and 33c of the fixation portion 320 positioned on the other side in the axial direction connect the outer peripheral surface 21b of the outer ring 21 and the split member 341 to each other. That is, the fixation portion 320 fixes each of the two split members 341 and 342 to the outer peripheral surface 21b of the outer ring 21.

It should be noted herein that the chip 35 is mainly made of a semiconductor material (e.g., silicon), and that the intermediate member 34 is mainly made of a metal member (e.g., copper). Therefore, there is a difference in thermal expansion coefficient between the intermediate member 34 and the chip 35. More specifically, the intermediate member 34 has a larger thermal expansion coefficient than that of the chip 35. Therefore, in the case where the intermediate member 34 is formed of a single plate, the chip 35 may detect deformation of the intermediate member 34 resulting from thermal expansion thereof as a strain, and thus may detect a strain larger than the true strain of the rolling bearing 2, depending on the temperature during measuring of the strain.

In contrast, in the present modification example, the intermediate member 34 is split into the two split members 341 and 342. Moreover, when the outer peripheral surface 21b of the outer ring 21 elongates (or contracts) due to a strain, the split members 341 and 342 move away from (or toward) each other in the direction in which the intermediate member 34 is split into the split members 341 and 342 (in the axial direction in the present modification example). Therefore, the chip 35 preferentially detects the strain of the outer peripheral surface 21b in the direction in which the intermediate member 34 is split.

The intermediate member 34 has a shape that is long in a direction (in the circumferential direction in the present modification example) different from the direction in which the intermediate member 34 is split. Therefore, the direction in which the amount of elongation and contraction of the intermediate member 34 due to thermal expansion is large (the intermediate member 34 mainly elongates and contracts) is different from the direction in which the intermediate member 34 is split. Thus, even in the case where there is a difference in thermal expansion coefficient between the intermediate member 34 and the chip 35, the direction in which the intermediate member 34 moves due to the strain of the outer peripheral surface 21b and the direction in which the intermediate member 34 elongates and contracts due to thermal expansion can be made different from each other by splitting the intermediate member 34 into split members 341 and 342 disposed to face each other across the detection region 35a of the chip 35. Therefore, the chip 35 is unlikely to detect the deformation of the intermediate member 34 resulting from thermal expansion, as a strain. As a result, the chip 35 can more accurately detect the strain of the rolling bearing 2.

The description has been given citing, as an example, the split members 341 and 342 into which the intermediate member 34 is split in the axial direction in the present modification example. However, instead of employing this configuration, the intermediate member may be split in the circumferential direction into two split members that are long in the axial direction. That is, the split members 341 and 342 may be positioned apart from each other in a direction including at least one of the axial direction of the rolling bearing 2 and the circumferential direction of the rolling bearing 2. In the case where the intermediate member 34 is split in the circumferential direction, the chip 35 preferentially detects the strain of the outer peripheral surface 21b in the circumferential direction, and the two split members thermally expand mainly in the axial direction. Therefore, in the same manner as described above, the chip 35 can more accurately detect the strain of the rolling bearing 2.

Ninth Modification Example

Figure 14A:
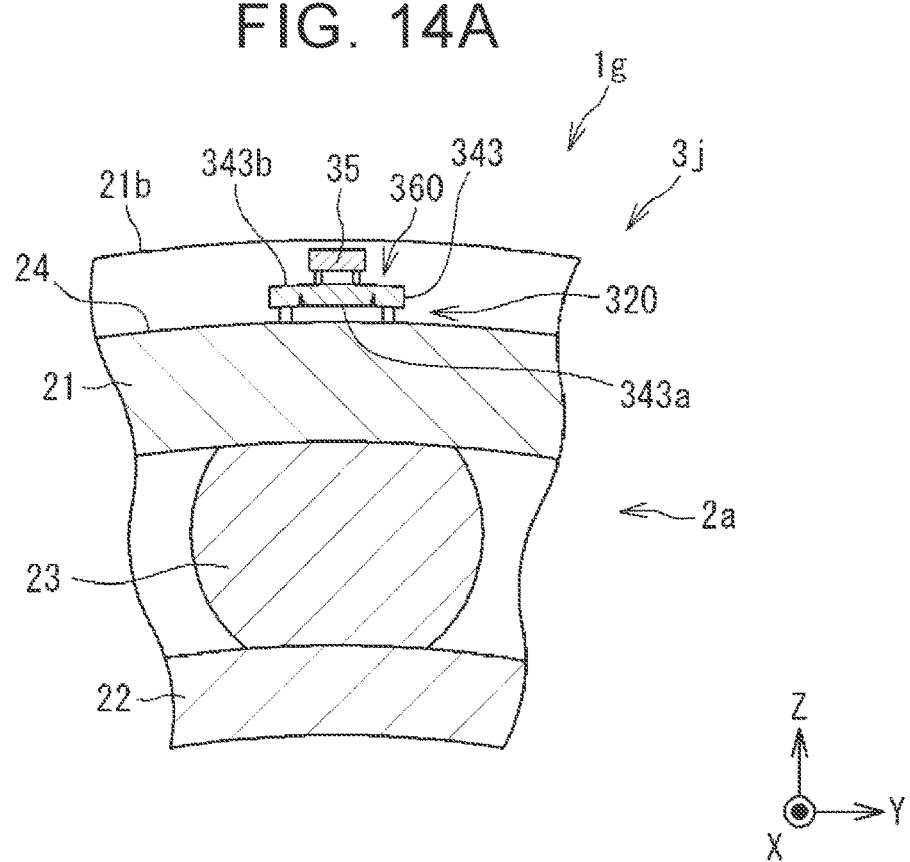
FIG. 14A is an illustrative view illustrating a rolling bearing device according to a ninth modification example.
Figure 14B:
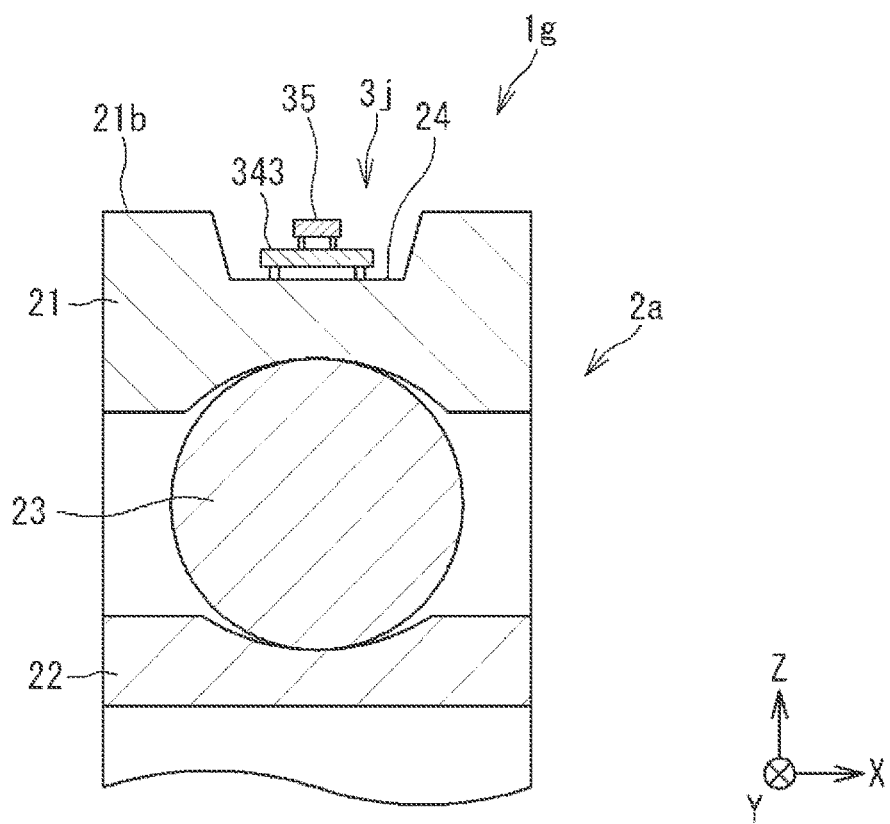
FIG. 14B is another illustrative view illustrating the rolling bearing device according to the ninth modification example.

FIGS. 14A and 14B are illustrative views of a rolling bearing device 1g according to the ninth modification example. The present modification example is obtained by further modifying the second modification example. In the second modification example, as shown in FIG. 5, the intermediate member 34 is formed as a single plate extending parallel to a tangent of the outer peripheral surface 21b of the outer ring 21. In contrast, a later-described intermediate member 343 included in the rolling bearing device 1g of the present modification example is bent in a direction along the outer peripheral surface 21b of the outer ring 21.

FIG. 14A is a cross-sectional view showing the rolling bearing device 1g cut along the same plane as in FIG. 5. FIG. 14B is a cross-sectional view showing the rolling bearing device 1g cut along the same plane as in FIG. 6. The rolling bearing device 1g includes the rolling bearing 2a and a strain detection unit 3j. The rolling bearing 2a has the same configuration as that of the rolling bearing 2a according to the above-mentioned sixth modification example. More specifically, the rolling bearing 2a has the groove portion 24 in the outer peripheral surface 21b of the outer ring 21. The strain detection unit 3j is accommodated in the groove portion 24.

The strain detection unit 3j includes a strain sensor 316 and the fixation portion 320. The fixation portion 320 fixes the strain sensor 316 to a bottom of the groove portion 24. The strain sensor 316 includes the intermediate member 343, the chip 35, and the second fixation portion 360 configured to fix the chip 35 to the intermediate member 343. The chip 35 includes a strain gauge configured to detect a strain. It should be noted herein that the chip 35 is fixed to the intermediate member 343 such that the strain gauge detects a strain in the axial direction.

The intermediate member 343 has a first surface 343a positioned on the side of the outer peripheral surface 21b of the outer ring 21, and a second surface 343b positioned on the side opposite to the outer peripheral surface 21b (i.e., on the radially outer side). A plurality of (e.g., two) grooves G1 are formed in the first surface 343a. Each of the grooves G1 has, for example, a triangular shape (a wedge shape), and is provided to linearly extend in the entire first surface 343a in the axial direction.

As shown in FIG. 14A, the intermediate member 343 is bent with the same curvature as that of the groove portion 24, such that the first surface 343a becomes concave and that the second surface 343b becomes convex. In other words, the intermediate member 343 is bent in the direction along the groove portion 24.

In order to keep the strength of the outer ring 21, the groove portion 24 is preferably provided in a smallest possible size. Therefore, the strain detection unit 3j is also preferably provided more compactly in the groove portion 24. In the present modification example, the intermediate member 343 is fitted to the groove portion 24 by the fixation portion 320, while being bent in the direction along the groove portion 24. Therefore, the strain detection unit 3j can be more compactly provided in the groove portion 24. As a result, the groove portion 24 can be provided in a smaller size, and the strength of the outer ring 21 can be maintained to be high.

Furthermore, the intermediate member 343 is bent in the direction along the groove portion 24. Therefore, the intermediate member 343 deforms while more accurately reflecting the strain of the groove portion 24. Therefore, the strain detection unit 3j can more accurately detect the strain of the rolling bearing 2a.

Figure 15A:
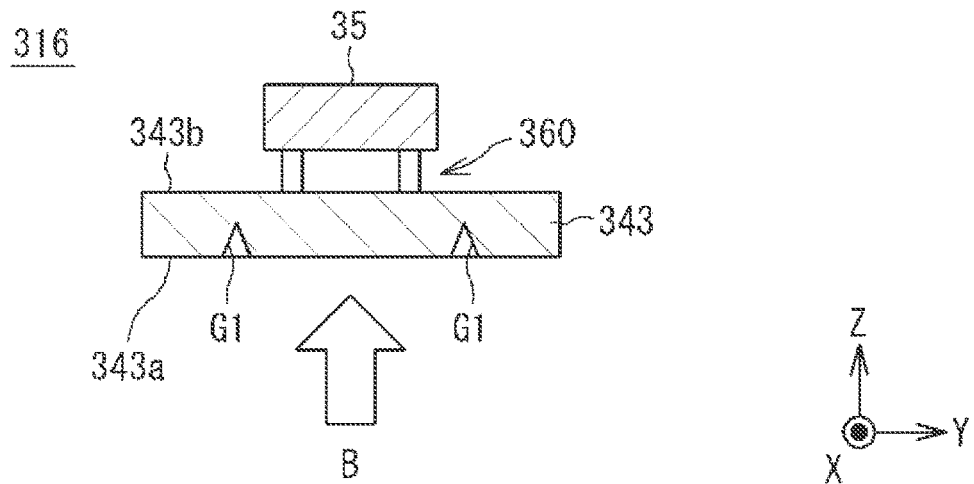
FIG. 15A is an illustrative view of a procedure of installing a strain sensor according to the ninth modification example in groove portions.
Figure 15B:
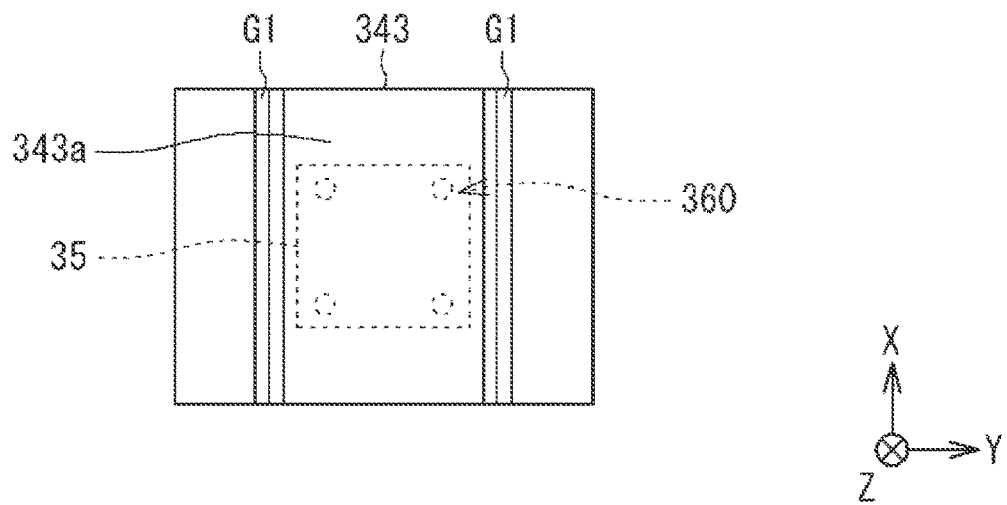
FIG. 15B is another illustrative view of the procedure of installing the strain sensor according to the ninth modification example in the groove portions.
Figure 15C:
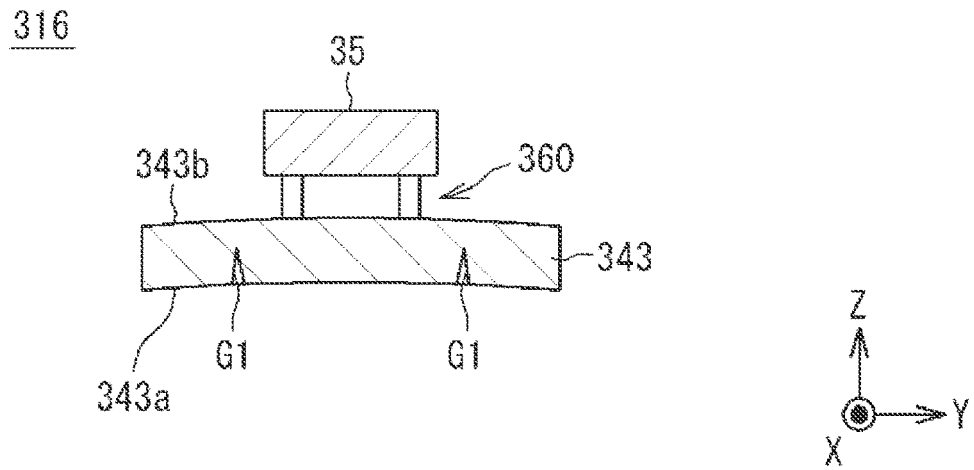
FIG. 15C is still another illustrative view of the procedure of installing the strain sensor according to the ninth modification example in the groove portions.

FIGS. 15A, 15B, and 15C are illustrative views of the procedure of installing the strain sensor 316 in the groove portion 24. First of all, as shown in FIG. 15A, the chip 35 is fixed to the second surface 343b of the intermediate member 343 by the second fixation portion 360. It should be noted herein that FIG. 15B is a bottom view of the strain sensor 316 when viewed in a direction indicated by an arrow B of FIG. 15A. In FIG. 15B, the first surface 343a of the intermediate member 343 is visible, and the chip 35 and the second fixation portion 360 are hidden behind the intermediate member 343. In FIG. 15B, for the sake of explanation, the chip 35 and the second fixation portion 360 are indicated by broken lines. As shown in FIG. 15B, the chip 35 and the second fixation portion 360 are provided between the grooves G1 that are adjacent to each other in the circumferential direction.

Subsequently, as shown in FIG. 15C, the intermediate member 343 is bent such that the first surface 343a becomes concave and that the second surface 343b becomes convex. At this time, the intermediate member 343 is bent with the same curvature as that of the outer peripheral surface 21b. Finally, as shown in FIGS. 14A and 14B, the strain sensor 316 (more specifically, the intermediate member 343) is fixed to the groove portion 24 by the fixation portion 320.

It should be noted herein that when a large stress is produced in the second fixation portion 360, the joint between the intermediate member 343 or the chip 35 and the second fixation portion 360 weakens, and thus, the life of the strain sensor 316 tends to become short. In the present modification example, the grooves G1 are provided on the second surface 343b of the intermediate member 343. Therefore, when being bent, the intermediate member 343 deforms such that the grooves G1 become small. As described hitherto, the first surface 343a fixed to the rolling bearing 2a more greatly deforms than the second surface 343b on which the chip 35 is provided. Thus, it is possible to reduce the possibility that a large stress is produced in the second fixation portion 360 that fixes the chip 35 and the intermediate member 343 to each other. As a result, the strain sensor 316 can more accurately detect the strain, while the life of the strain sensor 316 is restrained from becoming short.

Besides, the chip 35 detects the strain in the axial direction. Therefore, the chip 35 can be prevented from detecting, as a strain, the deformation of the intermediate member 343 resulting from the bending of the intermediate member 343 in the circumferential direction. Thus, the strain sensor 316 can more accurately detect the strain.

Tenth Modification Example

FIGS. 16A and 16B, FIGS. 17A and 17B, and FIGS. 18A and 18B are illustrative views of intermediate members obtained by further modifying the intermediate member 343 according to the ninth modification example. FIG. 16A, FIG. 17A, and FIG. 18A respectively show intermediate members 344, 345, and 346, in the same cross-section as in FIG. 15A. The intermediate members 344, 345, and 346 have first surfaces 344a, 345a, and 346a positioned on the side of the outer peripheral surface 21b of the outer ring 21, and second surfaces 344b, 345b, and 346b positioned on the side opposite to the outer peripheral surface 21b (i.e., on the radially outer side).

FIGS. 16B, 17B, and 18B are bottom views of the intermediate members 344, 345, and 346 when viewed from the first surfaces 344a, 345a, and 346a-sides, respectively. As is the case with the intermediate member 343, the intermediate member 344, 345, or 346 is fixed to the groove portion 24 by the fixation portion 320 while being bent in the direction along the groove portion 24, with the first surface 344a, 345a, or 346a being concave, and with the second surface 344b, 345b, or 346b being convex.

Three grooves G2 are formed in the first surface 344a of the intermediate member 344. Each of the grooves G2 has a rectangular shape (the shape of a rectangular parallelepiped), and are provided to extend linearly in the entire first surface 344a in the axial direction. Even in the case where the grooves are different in number and shape from the grooves G1 of the ninth modification example in this manner, an effect similar to that of the ninth modification example is obtained.

A single groove G3 is formed in the first surface 345a of the intermediate member 345. The groove G3 has a rectangular shape (the shape of a rectangular parallelepiped), and is provided to extend linearly in the entire first surface 345a in the axial direction. The length of the groove G3 in the circumferential direction is equal to or larger than a half of the length of the first surface 345a in the circumferential direction. Even in the case where the single groove G3 is provided in this manner, an effect similar to that of the ninth modification example is obtained.

Six grooves G4 are formed in the first surface 346a of the intermediate member 346. Each of the grooves G4 has a rectangular shape (the shape of a rectangular parallelepiped or a cube). Two of the grooves G4 are provided in each column in the axial direction, and three of the grooves G4 are provided in each row in the circumferential direction. Even in the case where the grooves G4 are not provided to linearly extend entirely along the axial direction in this manner, an effect similar to that of the ninth modification example is obtained.

Eleventh Modification Example

Figure 19:
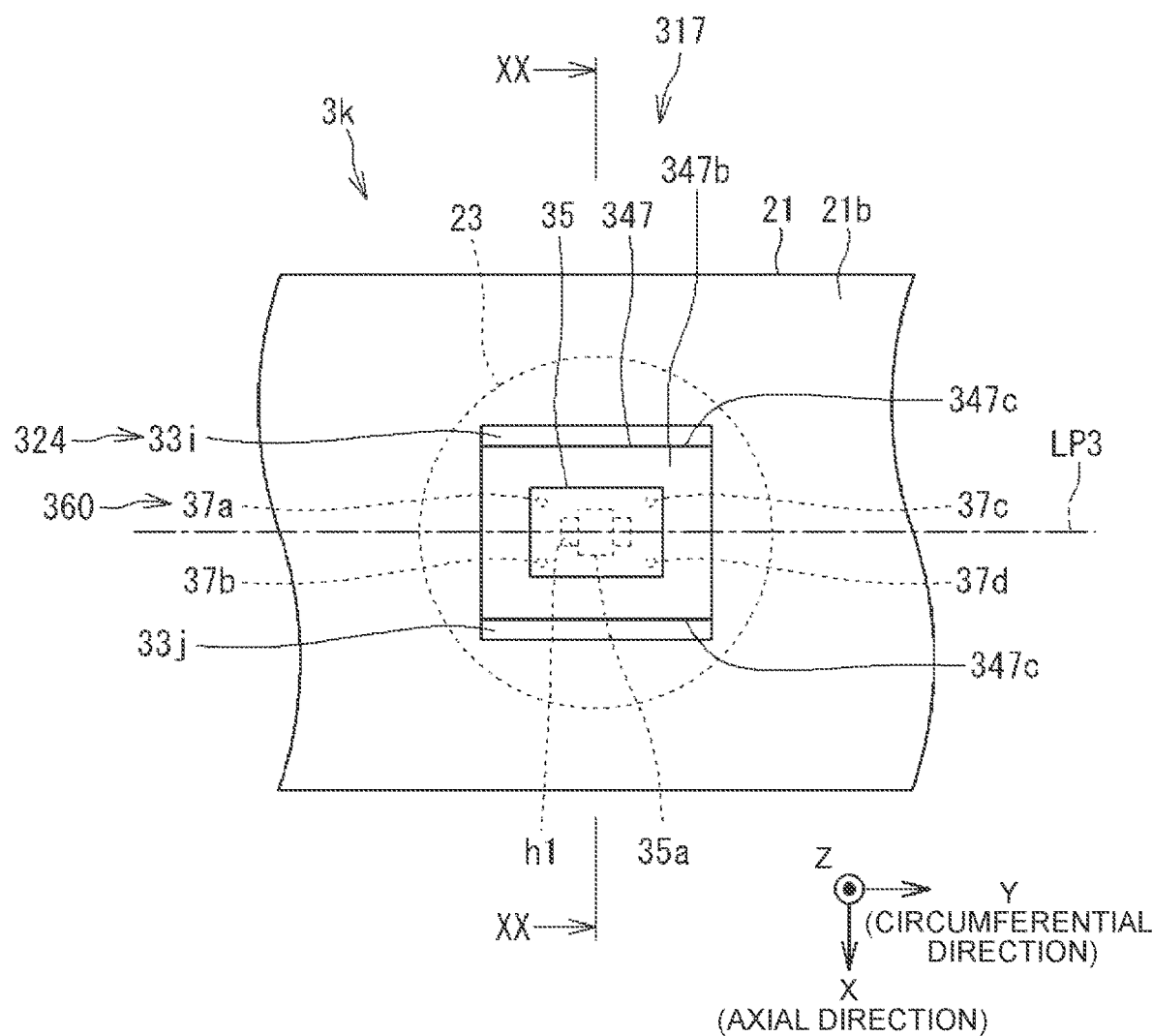
FIG. 19 is an illustrative view illustrating a strain detection unit according to an eleventh modification example.
Figure 20:
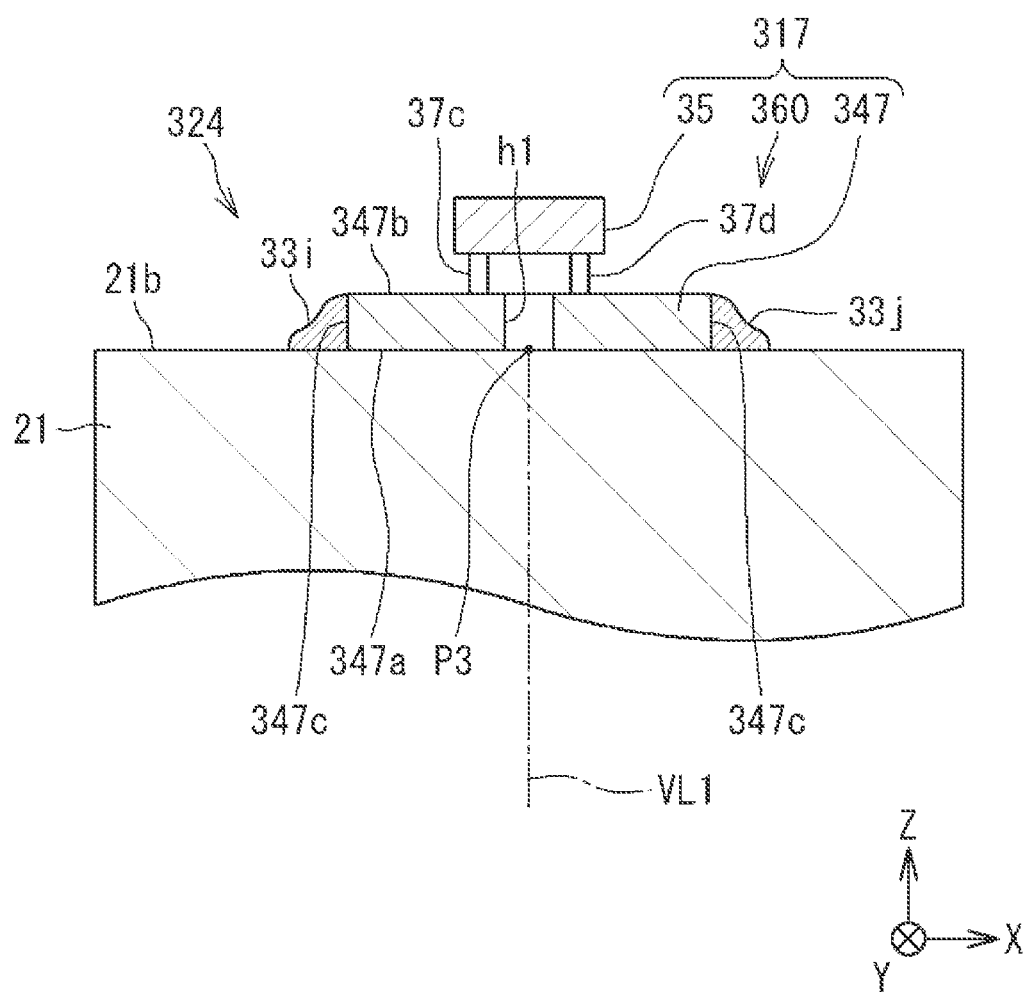
FIG. 20 is a cross-sectional view partially showing a cross-section cut along a cutting line indicated by an arrow XX of FIG. 19.

FIGS. 19 and 20 are illustrative views of a strain detection unit 3k according to the eleventh modification example. The present modification example is an example obtained by further modifying the second modification example. FIG. 19 is a plan view including the strain detection unit 3k when viewed in the same direction as in FIG. 3. FIG. 20 is a cross-sectional view partially showing a cross-section cut along a cutting line indicated by an arrow XX of FIG. 19. The strain detection unit 3k according to the present modification example includes a strain sensor 317 and a fixation portion 324.

The strain sensor 317 includes the chip 35, an intermediate member 347, and the second fixation portion 360. The intermediate member 347 is a single thin plate made of metal (e.g., copper). As shown in FIG. 20, the intermediate member 347 has a first surface 347a on the side of the outer peripheral surface 21b, a second surface 347b on the side opposite to the outer peripheral surface 21b, and lateral surfaces 347c. The two lateral surfaces 347c of the intermediate member 347 positioned in the axial direction are fixed to the outer peripheral surface 21b by the fixation portion 324. The fixation portion 324 is formed through the use of welding, and includes a plurality of joint portions 33i and 33j. The joint portions 33i and 33j are weld beads, and include a metal material for forming the intermediate member 347, and a metal material for forming the outer ring 21. The joint portions 33i and 33j may further include a metal material serving as a base material in addition to the intermediate member 347 and the outer ring 21. The first surface 347a of the intermediate member 347 is in contact with the outer peripheral surface 21b without being fixed thereto.

A hole h1 extending from the first surface 347a to the second surface 347b is formed in the intermediate member

347. As shown in FIG. 19, in a plan view obtained when the strain sensor 317 is viewed in the radial direction, at least part of the hole h1 is formed at a position overlapping with the virtual line LP3. Besides, in the plan view obtained when the strain sensor 317 is viewed in the radial direction in the same manner, at least part of the hole h1 is formed at a position overlapping with the detection region 35*a* of the chip. Besides, in the plan view obtained when the strain sensor 317 is viewed in the radial direction in the same manner, the hole h1 is formed inward of the second joint portions 37*a* to 37*d*.

It should be noted herein that the chip 35 is mainly made of a semiconductor material (e.g., silicon), and that the intermediate member 34 according to the above-mentioned second modification example is mainly made of a metal material (e.g., copper). Therefore, there is a difference in thermal expansion coefficient between the intermediate member 34 and the chip 35. More specifically, the intermediate member 34 has a larger thermal expansion coefficient than that of the chip 35. Therefore, the chip 35 may detect the deformation of the intermediate member 34 resulting from thermal expansion thereof, as a strain, and may detect a strain larger than the original strain of the rolling bearing 2 depending on the temperature during the measuring of the strain. In particular, a central part of the intermediate member 34 has a less space into which the thermally expanded metal material is released, than a peripheral edge part (a part close to the lateral surfaces) of the intermediate member 34. The central part may deform in such a manner as to expand radially outward or radially inward. When the central part of the intermediate member 34 expands radially outward due to thermal expansion and comes into contact with the chip 35, the chip 35 may erroneously detect the strain.

In contrast, in the present modification example, the hole h1 is formed in the intermediate member 347. Therefore, even in the case where the intermediate member 347 thermally expands, the intermediate member 347 deforms such that the hole h1 narrows. Thus, the intermediate member 347 can be prevented from deforming in the radial direction. That is, the hole h1 functions as "an absorption region" configured to absorb (release) the deformation resulting from the difference in thermal expansion between the chip 35 and the intermediate member 347. As a result, the chip 35 is unlikely to detect the deformation of the intermediate member 347 as a strain, and hence can more accurately detect the strain of the rolling bearing 2.

In particular, at least part of the hole h1 is formed at a position overlapping with the detection region 35*a* of the chip 35 in a plan view when viewed in the radial direction. Therefore, even in the case where the intermediate member 347 deforms through thermal expansion, the deformed intermediate member 347 can be more reliably prevented from coming into contact with the detection region 35*a*. As a result, the chip 35 can more accurately detect the strain of the rolling bearing 2.

The hole h1 is formed in the intermediate member 347. Therefore, the intermediate member 347 is more likely to deform due to the strain of the outer peripheral surface 21*b* than in the case where the hole h1 is not formed. For example, when the joint portion 33*i* and the joint portion 33*j* deform in such directions as to move away from each other in the axial direction due to the strain of the outer peripheral surface 21*b*, the intermediate member 347 is more likely to be elongated in the axial direction. As a result, the intermediate member 347 can transmit the strain of the outer peripheral surface 21*b* to the chip 35 with higher sensitivity.

Variation of Eleventh Modification Example

Figure 21A:
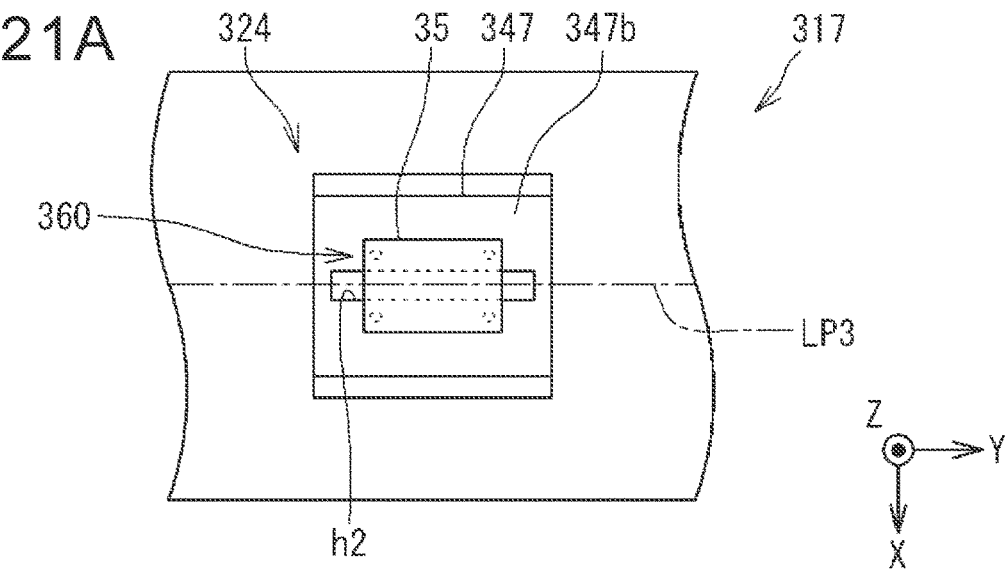
FIG. 21A is an illustrative view illustrating a variation of the eleventh modification example.

FIGS. 21A, 21B, and 21C and FIG. 22 are illustrative views each showing a variation of the hole h1 of the intermediate member 347 according to the eleventh modification example. As shown in FIG. 21A, a hole h2 may be formed in the intermediate member 347 instead of the hole h1. The hole h2 is a hole longer than the chip 35 in the circumferential direction, and is formed inward of the second fixation portion 360 in the axial direction. With this configuration, the intermediate member 347 is likely to deform in the axial direction due to the strain of the outer peripheral surface 21*b*. Therefore, the strain in the axial direction can be transmitted to the chip 35 with higher sensitivity, while preventing erroneous detection due to thermal expansion.

Figure 21B:
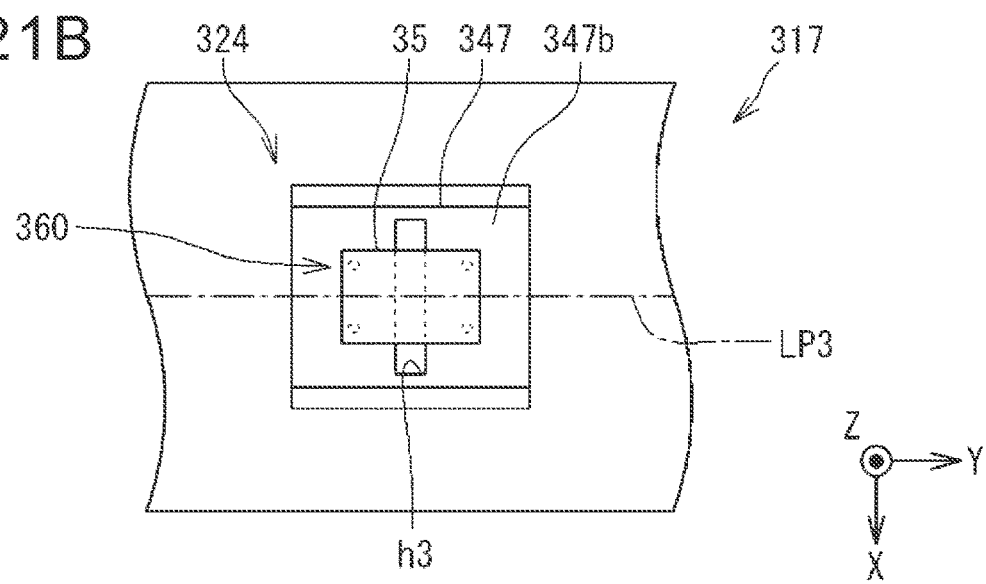
FIG. 21B is an illustrative view illustrating another variation of the eleventh modification example.

As shown in FIG. 21B, a hole h3 may be formed in the intermediate member 347 instead of the hole h1. The hole h3 is a hole longer than the chip 35 in the axial direction, and is formed inward the second fixation portion 360 in the circumferential direction. With this configuration, the intermediate member 347 is likely to deform in the circumferential direction due to the strain of the outer peripheral surface 21*b*. Therefore, the strain in the circumferential direction can be transmitted to the chip 35 with higher sensitivity, while preventing erroneous detection due to thermal expansion.

Figure 21C:
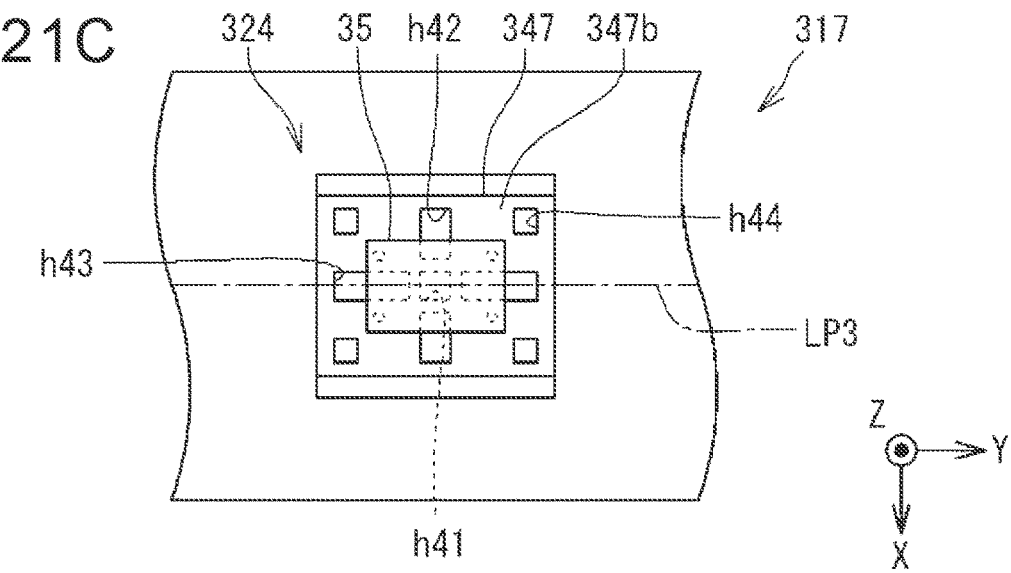
FIG. 21C is an illustrative view illustrating still another variation of the eleventh modification example.

As shown in FIG. 21C, a plurality of holes h41, h42, h43, and h44 may be formed in the intermediate member 347 instead of the hole h1. The hole h41 is a hole formed inward of the second fixation portion 360 in the axial direction and the circumferential direction. Each of the holes h42 is a hole that is adjacent to the hole h41 in the axial direction and that has a region sticking out from the chip 35 in the axial direction in a plan view when viewed in the radial direction. Each of the holes h43 is a hole that is adjacent to the hole h41 in the circumferential direction and that has a region sticking out from the chip 35 in the circumferential direction in the plan view when viewed in the radial direction. Each of the holes h44 is a hole formed at a position that does not overlap with the chip 35 in the plan view when viewed in the radial direction. Each of the holes h41 to h44 functions as "an absorption region" configured to absorb the deformation resulting from the difference in thermal expansion between the chip 35 and the intermediate member 347.

As shown in FIG. 22, a notch Ct1 may be formed in the intermediate member 347 instead of the hole h1. The notch Ct1 is formed in such a manner as to be recessed toward the outer peripheral surface 21*b* from the second surface 347*b* of the intermediate member 347. The notch Ct1 may be formed so as to be recessed radially outward from the first surface 347*a* of the intermediate member 347 (i.e., so as to be recessed in a direction away from the outer peripheral surface 21*b*). That is, the notch Ct1 is formed in the first surface 347*a* or the second surface 347*b*. When the intermediate member 347 thermally expands, the notch Ct1 deforms such that the depth of recess decreases, and thus absorbs the deformation resulting from the difference in thermal expansion between the chip 35 and the intermediate member 347. That is, the notch Ct1 functions as "an absorption region".

The holes h1, h2, h3, and h41 to h44 and the notch Ct1 can absorb not only the deformation of the intermediate member 347 resulting from the difference in thermal expansion between the chip 35 and the intermediate member 347, but also the deformation of the intermediate member 347 resulting from the difference in thermal expansion between the outer ring 21 and the intermediate member 347.

OTHERS

In each of the above-mentioned embodiment and the modification examples, the case where the rolling bearing 2 or 2a is a radial contact ball bearing has been described. However, the rolling bearing 2 or 2a may be an axial contact ball bearing, an angular contact radial ball bearing, or an angular contact thrust ball bearing. In the case of any type of rolling bearing, the virtual intersection point P3 is determined according to a method similar to that of the above-mentioned embodiment (the radial contact ball bearing).

The embodiment disclosed above is exemplary and non-restrictive in all respects. That is, the rolling bearing device of the disclosure is not limited to the illustrated embodiment, but may be realized as other embodiments within the scope of the disclosure.

What is claimed is:

1. A rolling bearing device comprising:
    a rolling bearing that includes an outer ring having an inner peripheral surface on which a first raceway surface is provided, an inner ring having an outer peripheral surface on which a second raceway surface is provided, and a plurality of rolling elements interposed between the first raceway surface and the second raceway surface;
    a strain sensor configured to detect a strain of the rolling bearing, the strain sensor including an intermediate member and a strain gauge; and
    a first fixation portion configured to fix the strain sensor to a peripheral surface that includes at least one of an outer peripheral surface of the outer ring and an inner peripheral surface of the inner ring, the first fixation portion fixing at least two locations on the strain sensor to the peripheral surface such that the strain sensor and the peripheral surface are not fixed to each other within a detection region of the strain sensor, the at least two locations facing each other across the detection region, wherein:
        a first surface or a lateral surface of the intermediate member is in contact with the first fixation portion, the first surface being located on a side of the peripheral surface,
        the strain gauge is fixed to a second surface of the intermediate member, the second surface being located on a side opposite to the peripheral surface,
        the strain gauge is included in the detection region of the strain sensor, and
        the strain sensor includes a second fixation portion configured to fix at least two locations on the strain sensor to the second surface, such that the strain gauge and the second surface are not fixed to each other within the detection region, the at least two locations in the strain sensor facing each other are across the detection region.

2. The rolling bearing device according to claim 1, wherein:
    the intermediate member includes two split members that are positioned apart from each other in a direction including at least one of an axial direction and a circumferential direction of the rolling bearing; and
    the second fixation portion fixes the strain gauge to each of the two split members.

3. The rolling bearing device according to claim 1, wherein the intermediate member includes an absorption region configured to absorb deformation of the intermediate member due to a difference in thermal expansion between the strain gauge or the peripheral surface and the intermediate member.

4. The rolling bearing device according to claim 3, wherein the absorption region is a hole extending from the first surface to the second surface, or a notch provided in the first surface or the second surface.

5. The rolling bearing device according to claim 3, wherein at least part of the absorption region is provided at a position that overlaps with the detection region in a plan view obtained when the strain sensor is viewed in a radial direction of the rolling bearing.

6. A rolling bearing device comprising:
    a rolling bearing that includes an outer ring having an inner peripheral surface on which a first raceway surface is provided, an inner ring having an outer peripheral surface on which a second raceway surface is provided, and a plurality of rolling elements interposed between the first raceway surface and the second raceway surface;
    a strain sensor configured to detect a strain of the rolling bearing; and
    a first fixation portion configured to fix the strain sensor to a peripheral surface that includes at least one of an outer peripheral surface of the outer ring and an inner peripheral surface of the inner ring, the first fixation portion fixing at least two locations on the strain sensor to the peripheral surface such that a detection region is such that the strain sensor and the peripheral surface are not fixed to each other, the at least two locations facing each other across the detection region, wherein:
        the fixation portion fixes the strain sensor to at least two locations in the peripheral surface that face each other across a virtual intersection point where the peripheral surface and a virtual line intersect each other, the virtual line passing through a first point where one of the rolling elements contacts the first raceway surface and a second point where the one of the rolling elements contacts the second raceway surface; and
        the strain sensor is not fixed to the virtual intersection point.

7. A rolling bearing device comprising:
    a rolling bearing that includes an outer ring having an inner peripheral surface on which a first raceway surface is provided, an inner ring having an outer peripheral surface on which a second raceway surface is provided, and a plurality of rolling elements interposed between the first raceway surface and the second raceway surface;
    a strain sensor configured to detect a strain of the rolling bearing; and
    a first fixation portion configured to fix the strain sensor to a peripheral surface that includes at least one of an outer peripheral surface of the outer ring and an inner peripheral surface of the inner ring, the first fixation portion fixing at least two locations on the strain sensor to the peripheral surface such that a detection region is such that the strain sensor and the peripheral surface are not fixed to each other, the at least two locations facing each other across the detection region, wherein:
        the first fixation portion includes a plurality of joint portions configured to join the strain sensor and the peripheral surface to each other;

each one of the plurality of joint portions has a shape that is longer in one of a circumferential direction and an axial direction of the rolling bearing and that is shorter in another direction defined as the other of the circumferential direction and the axial direction of the rolling bearing;

at least two of the plurality of joint portions are positioned apart from each other in the other direction and parallel to each other;

the strain sensor is not fixed to the peripheral surface at a position between the plurality of joint portions positioned parallel to each other;

the strain sensor includes a plurality of strain sensors;

the first fixation portion includes a plurality of fixation portions that respectively fix the plurality of strain sensors to the peripheral surface; and the plurality of strain sensors include (i) a first strain sensor joined to the peripheral surface by the plurality of joint portions each having a shape that is long in the circumferential direction and that is short in the axial direction, and (ii) a second strain sensor joined to the peripheral surface by the joint portions each having a shape that is relatively longer in the axial direction and that is relatively shorter in the circumferential direction.

\* \* \* \* \*